United States Patent
Asai

(10) Patent No.: US 9,350,947 B2
(45) Date of Patent: *May 24, 2016

(54) COMMUNICATION MANAGEMENT SYSTEM, COMMUNICATION SYSTEM, COMPUTER-READABLE RECORDING MEDIUM, AND MAINTENANCE SYSTEM

(71) Applicant: RICOH COMPANY, LTD., Tokyo (JP)

(72) Inventor: Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/368,986

(22) PCT Filed: Dec. 26, 2012

(86) PCT No.: PCT/JP2012/084288
§ 371 (c)(1),
(2) Date: Jun. 26, 2014

(87) PCT Pub. No.: WO2013/100184
PCT Pub. Date: Jul. 4, 2013

(65) Prior Publication Data
US 2014/0375757 A1     Dec. 25, 2014

(30) Foreign Application Priority Data

Dec. 27, 2011  (JP) .................................. 2011-285768
Nov. 30, 2012  (JP) .................................. 2012-262456

(51) Int. Cl.
*H04N 7/14*      (2006.01)
*H04N 7/15*      (2006.01)
(Continued)

(52) U.S. Cl.
CPC ............ *H04N 7/152* (2013.01); *H04L 12/1813* (2013.01); *H04L 12/1818* (2013.01); *H04L 65/605* (2013.01); *H04M 3/00* (2013.01); *H04M 3/56* (2013.01); *H04N 7/15* (2013.01)

(58) Field of Classification Search
USPC ....................................................... 348/14.01
See application file for complete search history.

(56) References Cited

U.S. PATENT DOCUMENTS 7,079,495 B1 *  7/2006  Pearce ................ H04L 12/1818
                                                              340/3.52
7,383,341 B1 *  6/2008  Saito ................... H04L 12/2834
                                                              709/228

(Continued)

FOREIGN PATENT DOCUMENTS

CN          101507267 A      8/2009
JP          2003-143323      5/2003

(Continued)

OTHER PUBLICATIONS

Extended European Search Report issued May 19, 2015 in Patent Application No. 12862181.0

(Continued)

*Primary Examiner* — Maria El-Zoobi
(74) *Attorney, Agent, or Firm* — Oblon, McClelland, Maier & Neustadt, L.L.P

(57) ABSTRACT

A communication management system includes: a storage unit configured to store destination information of a first communication terminal that establishes a first session with a relay device that relays communication data, destination information of a conversion system that performs mutual conversion between communication schemes of communication data transmitted from the first communication terminal and a second communication terminal and establishes a second session with the relay device, and destination information of the second communication terminal that establishes a third session with the conversion system; a receiving unit configured to receive start request information to start communication between the communication terminals from the first communication terminal; an extracting unit configured to extract destination information of each communication terminal and the conversion system stored in the storage unit, based on the received start request information; and a transmitting unit configured to transmit the extracted destination information to the relay device.

20 Claims, 18 Drawing Sheets

(51) Int. Cl.
*H04M 3/00* (2006.01)
*H04M 3/56* (2006.01)
*H04L 12/18* (2006.01)
*H04L 29/06* (2006.01)

(56) References Cited

U.S. PATENT DOCUMENTS

| | | | |
|---|---|---|---|
| 2008/0112337 A1* | 5/2008 | Shaffer | H04L 12/1813 370/260 |
| 2008/0165864 A1 | 7/2008 | Eleftheriadis et al. | |
| 2008/0175325 A1* | 7/2008 | Hannuksela | H04N 21/222 375/240.26 |
| 2010/0002069 A1 | 1/2010 | Eleftheriadis et al. | |
| 2010/0328459 A1 | 12/2010 | Jang | |
| 2011/0202757 A1 | 8/2011 | Nakagawa et al. | |
| 2011/0216699 A1 | 9/2011 | Umehara et al. | |
| 2012/0002003 A1 | 1/2012 | Okita et al. | |
| 2012/0140021 A1 | 6/2012 | Tanaka et al. | |
| 2012/0221702 A1 | 8/2012 | Umehara et al. | |
| 2012/0293692 A1 | 11/2012 | Namie et al. | |
| 2012/0314019 A1 | 12/2012 | Asai | |
| 2013/0060926 A1 | 3/2013 | Kato et al. | |
| 2013/0166718 A1 | 6/2013 | Okuyama et al. | |

FOREIGN PATENT DOCUMENTS

| | | |
|---|---|---|
| JP | 2004-304241 | 10/2004 |
| JP | 2008-035476 | 2/2008 |
| JP | 2008-227577 | 9/2008 |
| JP | 2009-194661 | 8/2009 |
| JP | 2009-544176 | 12/2009 |
| JP | 2011-523330 | 8/2011 |
| JP | 2013-153418 | 8/2013 |
| WO | 2008/060262 A1 | 5/2008 |
| WO | WO 2008/084424 A1 | 7/2008 |
| WO | WO 2011/105621 A1 | 9/2011 |

OTHER PUBLICATIONS

Office Action mailed May 4, 2015 in co-pending U.S. Appl. No. 14/657,717.

International Search Report issued on Feb. 12, 2013 in PCT/JP2012/084288 filed on Dec. 26, 2012.

Combined Office Action and Search Report issued on Nov. 3, 2015 in Chinese Patent Application No. 201280070792.9 with English translation.

* cited by examiner

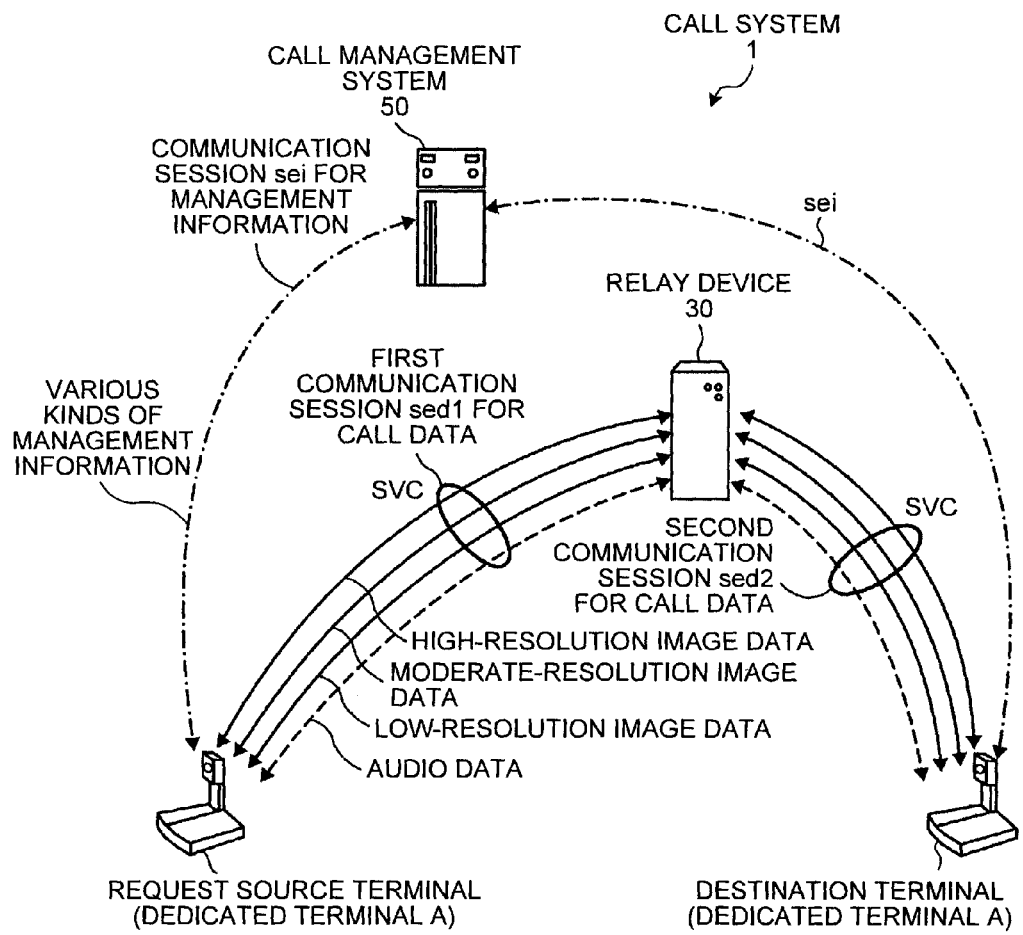
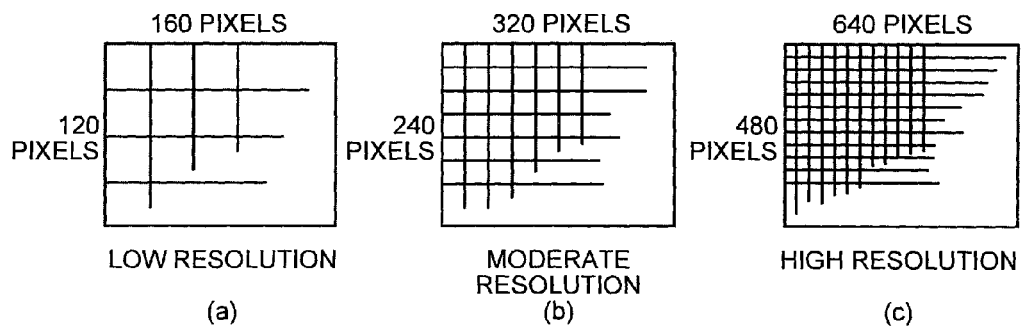

MODERATE RESOLUTION

FIG.10

CHANGED QUALITY MANAGEMENT TABLE

| IP ADDRESS OF RELAY DESTINATION TERMINAL | IMAGE QUALITY OF IMAGE DATA TO BE RELAYED (QUALITY OF IMAGE) |
|---|---|
| 1.3.1.4 | HIGH IMAGE QUALITY |
| 1.3.1.3 | HIGH IMAGE QUALITY |
| 1.2.2.3 | MODERATE IMAGE QUALITY |
| ... | ... |

FIG.11

RELAY DEVICE MANAGEMENT TABLE

| RELAY DEVICE ID | OPERATION STATUS | RECEPTION DATE AND TIME | IP ADDRESS OF RELAY DEVICE | MAXIMUM DATA CALL RATE (Mbps) |
|---|---|---|---|---|
| 111a | ONLINE | 2011.11.10.13:00 | 1.2.1.2 | 100 |
| 111b | ONLINE | 2011.11.10.13:10 | 1.2.2.2 | 1000 |
| 111c | ONLINE | 2011.11.10.13:20 | 1.3.1.2 | 10 |

FIG.12

TERMINAL INFORMATION MANAGEMENT TABLE

| TERMINAL ID | PASSWORD | MODEL NO. | SERIAL NO. | COMMUNICATION SCHEME |
|---|---|---|---|---|
| 01aa | aaaa | 9001 | 2001 | DEDICATED |
| 01ab | abab | 9001 | 2002 | DEDICATED |
| 01ac | acac | 9001 | 2003 | DEDICATED |
| ... | ... | ... | ... | ... |
| 01da | dada | 8001 | 1001 | NON-DEDICATED 1 |
| 01db | dbdb | 8001 | 1002 | NON-DEDICATED 2 |
| 01dc | dcdc | 8001 | 1003 | NON-DEDICATED 1 |
| ... | ... | ... | ... | ... |

FIG.13

TERMINAL STATUS MANAGEMENT TABLE

| TERMINAL ID | TERMINAL NAME | OPERATION STATUS | RECEPTION DATE AND TIME | IP ADDRESS OF TERMINAL |
|---|---|---|---|---|
| 01aa | AA TERMINAL OF TOKYO BUSINESS OFFICE IN JAPAN | ONLINE (CALL POSSIBLE) | 2011.11.10. 13:40 | 1.2.1.3 |
| 01ab | AA TERMINAL OF TOKYO BUSINESS OFFICE IN JAPAN | OFFLINE | 2011.11.9. 12:00 | 1.2.1.4 |
| ... | ... | ... | ... | ... |
| 01ba | BA TERMINAL OF OSAKA BUSINESS OFFICE IN JAPAN | ONLINE (TEMPORARY STOP) | 2011.11.10. 13:45 | 1.2.2.3 |
| 01bb | BB TERMINAL OF OSAKA BUSINESS OFFICE IN JAPAN | ONLINE (CALL POSSIBLE) | 2011.11.10. 13:50 | 1.2.2.4 |
| ... | ... | ... | ... | ... |
| 01ca | CA TERMINAL OF NEW YORK BUSINESS OFFICE IN AMERICA | ONLINE (CALL POSSIBLE) | 2011.11.10. 12:45 | 1.3.1.3 |
| 01cb | CB TERMINAL OF NEW YORK BUSINESS OFFICE IN AMERICA | ONLINE (BUSY) | 2011.11.10. 13:55 | 1.3.1.4 |
| ... | ... | ... | ... | ... |
| 01da | DA TERMINAL OF WASHINGTON BUSINESS OFFICE IN AMERICA | | | |
| 01db | DB TERMINAL OF WASHINGTON BUSINESS OFFICE IN AMERICA | | | |
| ... | ... | | | |

FIG.14

DESTINATION LIST MANAGEMENT TABLE

| REQUEST SOURCE TERMINAL ID | DESTINATION TERMINAL ID |
|---|---|
| 01aa | 01ab, ···, 01ba, 01bb, ···, 01ca, 01cb, 01da, 01db |
| ··· | ··· |
| 01ba | 01aa, 01ab, 01ca, 01cb, 01da, 01db |
| ··· | ··· |
| 01ca | 01aa, 01ab, 01ba, ···, 01da, |
| ··· | ··· |
| 01da | 01aa, ··· |
| ··· | ··· |

FIG.15

SESSION MANAGEMENT TABLE

| RELAY DEVICE ID | REQUEST SOURCE TERMINAL ID | DESTINATION TERMINAL ID | DELAY TIME (ms) | RECEPTION DATE AND TIME OF DELAY INFORMATION |
|---|---|---|---|---|
| 111a | 01aa | 01ca | 200 | 2011.11.10.14:00 |
| 111b | 01ba | 01cb | 50 | 2011.11.10.14:10 |
| 111c | 01bb | 01cc | 400 | 2011.11.10.14:20 |
| ··· | ··· | ··· | ··· | ··· |

FIG.16

CONVERSION MANAGEMENT TABLE

| TERMINAL ID OF NON-DEDICATED TERMINAL | IP ADDRESS OF CONVERSION SYSTEM | IP ADDRESS OF NO-DEDICATED TERMINAL |
|---|---|---|
| 01da | 1.3.2.2 | 1.3.2.3 |
| 01db | 1.3.2.2 | 1.3.2.4 |
| 01dc | 1.3.2.2 | 1.3.2.5 |
| ... | ... | ... |

FIG.17

QUALITY MANAGEMENT TABLE

| DELAY TIME (ms) | IMAGE QUALITY OF IMAGE DATA (QUALITY OF IMAGE) |
|---|---|
| 0 TO 100 | HIGH IMAGE QUALITY |
| 100 TO 300 | MODERATE IMAGE QUALITY |
| 300 TO 500 | LOW IMAGE QUALITY |
| 500 TO | (INTERRUPTION) |

COMMUNICATION MANAGEMENT SYSTEM, COMMUNICATION SYSTEM, COMPUTER-READABLE RECORDING MEDIUM, AND MAINTENANCE SYSTEM

TECHNICAL FIELD

The present invention relates to management of first and second communication terminals that transmit and receive predetermined call data.

BACKGROUND ART

In recent years, with the request for reduction of business trip expenses and a business trip time, call systems in which video conferences are performed through a communication network such as the Internet are in widespread use. In this call system, a video conference can be conducted such that image data and audio data are transmitted and received between a plurality of call terminals.

Besides a call system of a type in which image data and audio data are transmitted and received directly between call terminals, video conference systems of a type in which a plurality of relay devices are used to relay image data and audio data between a plurality of call terminals have been emerged (see Japanese Patent Application Laid-open No. 2008-227577).

However, in the video conference call system according to the related art, it is difficult to implement a call between call terminals using different call schemes. In other words, when call terminals differ in call scheme from each other, for example, when call terminals differ in at least one of a call control scheme (a call control protocol) for establishing or disconnecting a connection with a destination of a call and a coding scheme for converting image data and audio data into IP packets, there occurs a problem in that it is difficult to implement a call between the call terminals.

DISCLOSURE OF INVENTION

It is an object of the present invention to at least partially solve the problems in the conventional technology.

According to an embodiment, a communication management system for managing first and second communication terminals that transmit and receive predetermined communication data. The communication management system includes a storage unit configured to store therein destination information representing a destination of the first communication terminal that establishes a first communication session with a relay device that relays the communication data, destination information representing a destination of a conversion system that performs mutual conversion between a communication scheme of communication data transmitted from the first communication terminal and a communication scheme of communication data transmitted from the second communication terminal and establishes a second communication session with the relay device, and destination information representing a destination of the second communication terminal that establishes a third communication session with the conversion system; a receiving unit configured to receive start request information to start communication between the first communication terminal and the second communication terminal from the first communication terminal; an extracting unit configured to extract destination information of each of the first and the second communication terminals and the conversion system stored in the storage unit, on the basis of the received start request information; and a transmitting unit configured to transmit the extracted destination information to the relay device.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 2 is a conceptual diagram illustrating a communication status when a call is implemented between call terminals having the same communication scheme;

FIG. 3 is a conceptual diagram illustrating image quality of image data transmitted and received according to an SVC standard in FIGS. 2 and 4;

FIG. 10 is a conceptual diagram illustrating a changed quality management table;

FIG. 11 is a conceptual diagram illustrating a relay device management table;

FIG. 12 is a conceptual diagram illustrating a terminal information management table;

FIG. 13 is a conceptual diagram illustrating a terminal status management table;

FIG. 14 is a conceptual diagram illustrating a destination list management table;

FIG. 15 is a conceptual diagram illustrating a session management table;

FIG. 16 is a conceptual diagram illustrating a conversion management table;

FIG. 17 is a conceptual diagram illustrating a quality management table;

BEST MODE(S) FOR CARRYING OUT THE INVENTION

Hereinafter, embodiments of the present invention will be described with reference to FIGS. 1 to 25.

Overall Configuration of Embodiment

Figure 1:
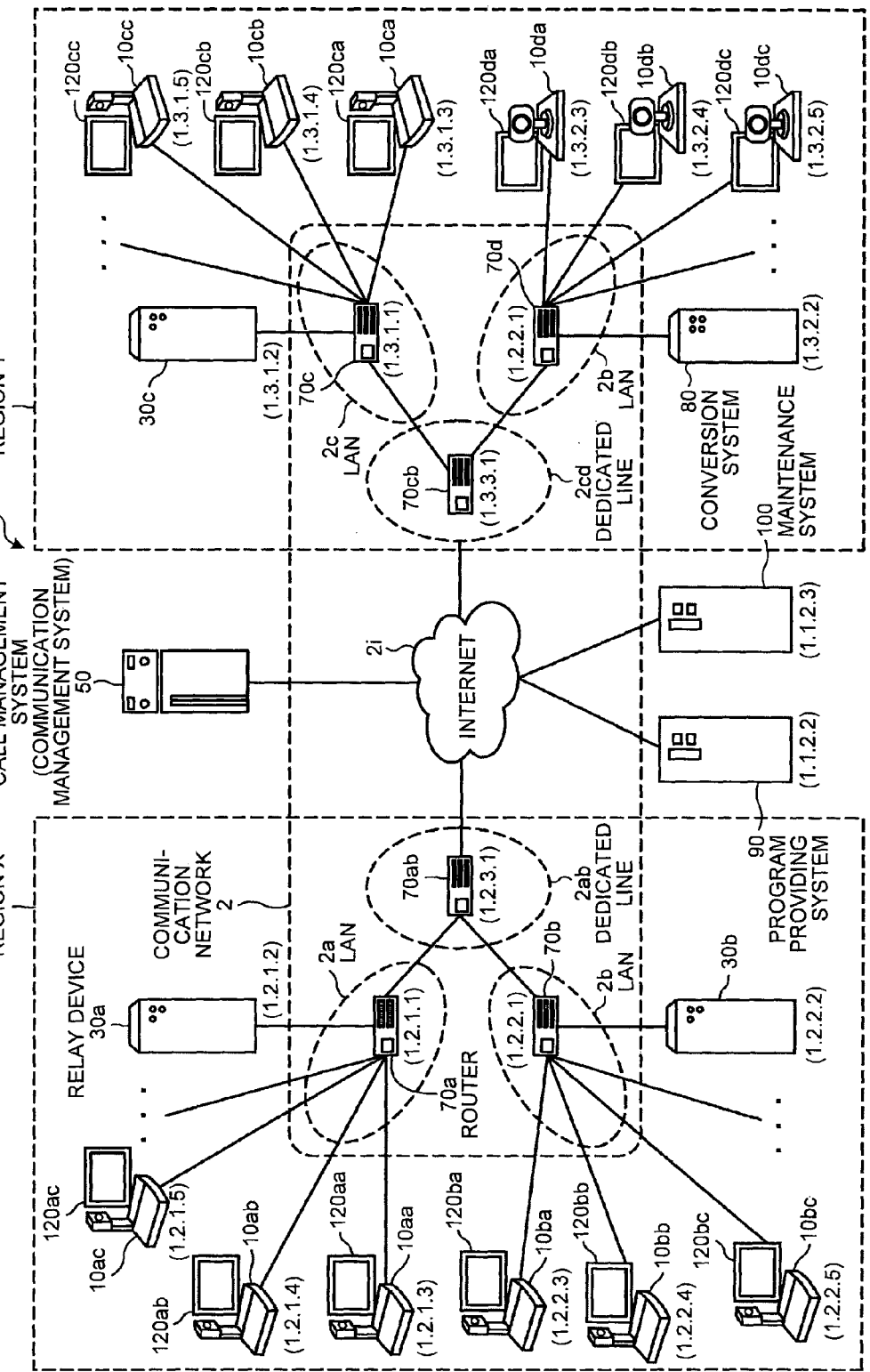
FIG. 1 is a schematic diagram of a call system according to an embodiment.

FIG. 1 is a schematic diagram of a call system according to an embodiment of the present invention. Referring to FIG. 1, a call system 1 is constructed by a plurality of call terminals (10aa, 10ab, . . . ), displays (120aa, 120ab, . . . ) of the respective call terminals (10aa, 10ab, . . . ), a plurality of relay devices (30a, 30b, and 30c), a call management system 50, a conversion system 80, a program providing system 90, and a maintenance system 100. Through the call system 1, communication of image data and audio data as an example of call data is performed, and thus, for example, a video conference between remote sites can be implemented. A plurality of routers (70a, 70b, 70c, 70d, 70ab, and 70cd) select an optimal path of call data.

The call terminals (10aa, 10ab, 10ac, . . . ), the relay device 30a, and the router 70a are connected to perform communication with one another via a local area network (LAN) 2a. The call terminals (10ba, 10bb, 10bc, . . . ), the relay device 30b, and the router 70b are connected to perform communication with one another via a LAN 2b. The LAN 2a and the LAN 2b are connected to perform communication with each other via a dedicated line 2ab including the router 70ab. Further, the LAN 2a, the LAN 2b, and the dedicated line 2ab are constructed in a predetermined region X. For example, the region X is Japan, the LAN 2a is constructed in a business office in Tokyo, and the LAN 2b is constructed in a business office in Osaka.

Meanwhile, the call terminals (10ca, 10cb, 10cc, . . . ), the relay device 30c, and the router 70c are connected to perform communication with one another via a LAN 2c. The call terminals (10da, 10db, 10dc, . . . ), the conversion system 80, and the router 70d are connected to perform communication with one another via a LAN 2d. Further, the LAN 2c and the LAN 2d are connected to perform communication with each other via a dedicated line 2cd including the router 70cd. Further, the LAN 2c, the LAN 2d, and the dedicated line 2cd are constructed in a predetermined region Y. For example, the region Y is the USA, the LAN 2c is constructed in a business office in New York, and the LAN 2d is constructed in a business office in Washington D.C. The region X and the region Y are connected to perform communication with each other via the Internet 2i from the routers (70ab, 70cd).

In the following, a "call terminal" is referred to simply as a "terminal", and a "call management system" is referred to simply as a "management system". An arbitrary one of a plurality of terminals (10aa, 10ab, . . . ) is referred to as a "terminal 10", an arbitrary one of a plurality of displays (120aa, 120ab, . . . ) is referred to as a "display 120", and an arbitrary one of a plurality of relay devices (30a, 30b, 30c) is referred to as a "relay device 30". Further, a terminal serving as a request source that requests a start of a video conference is referred to as a "request source terminal", and a terminal serving as a destination (a relay destination) that is a request destination is referred to as a "destination terminal". Further, an arbitrary one of the routers (70a, 70b, 70c, 70d, 70ab, 70cd) is referred to as a "router 70".

The call management system 50, the program providing system 90, and the maintenance system 100 are connected to the Internet 2i. In the present embodiment, the conversion system 80 is connected to the router 70d in the LAN 2d in the region Y. The call management system 50, the program providing system 90, and the maintenance system 100 may be installed in the region X or the region Y or may be installed in any other region.

In the present embodiment, a communication network 2 of the present embodiment is constructed by the LAN 2a, the LAN 2b, the dedicated line 2ab, the Internet 2i, the dedicated line 2cd, the LAN 2c, and the LAN 2d. In the communication network 2, there may be a place in which communication is performed in a wireless manner such as WiFi (Wireless Fidelity) or Bluetooth (registered trademark) as well as a wired manner.

In FIG. 1, 4-set digits illustrated below each terminal 10, each relay device 30, the call management system 50, each router 70, the conversion system 80, the program providing system 90, and the maintenance system 100 simply represent an IP address in typical IPv4. For example, the IP address of the terminal 10aa is "1.2.1.3". IPv6 may be used rather than IPv4, but the description will proceed with IPv4 for the sake of simplification of description.

Each terminal 10 may be used not only for a call between a plurality of business offices or a call between different rooms in the same business office but also for a call within the same room, a call between an indoor place and an outdoor place, or a call between outdoor places. When each terminal 10 is used outdoor, communication is performed by a wireless manner such as a cellular telecommunication network.

Each terminal 10 illustrated in FIG. 1 is a terminal that implements a user's call by transmitting and receiving call data, and is a terminal for a video conference, for example. Further, the terminal 10 performs transmission and reception of call data using a predetermined communication scheme (a call control scheme for establishing or disconnecting a connection with a destination of a call and a coding scheme for converting call data into IP packets).

Here, the examples of the call control scheme includes (1) a session initiation protocol (SIP), (2) a H.323, (3) a protocol extended from the SIP, (4) a protocol of an instant messenger, (5) a protocol using a MESSAGE method of the SIP, (6) a protocol of Internet Relay Chat (IRC), and (7) a protocol extended from a protocol of an instant messenger. Of these, for example, (4) the protocol of the instant messenger is a protocol used for (4-1) an extensible messaging and presence protocol (XMPP) or (4-2) a protocol used in ICQ (registered trademark), AIM (registered trademark), Skype (registered trademark), or the like. Further, for example, (7) the protocol extended from the protocol of the instant messenger is jingle.

Among a plurality of terminals 10, a terminal 10 that uses a communication scheme in which a call control scheme is a protocol of an instant messenger (or a protocol extended from a protocol of an instant messenger), and a coding scheme is a scalable video coding (SVC) is referred to as a "dedicated terminal A". Further, among a plurality of terminals 10, a terminal 10 that has an IP address that is not managed by the call management system 50 and uses a communication scheme in which at least one of the call control scheme and the coding scheme is different from one of the dedicated terminal A is referred to as a "non-dedicated terminal D". Further, in the present embodiment, "dedicated terminal A" is described as a terminal which is manufactured, sold, or managed by a specific company, and the "non-dedicated terminal D" is described as a terminal which is manufactured, sold, or managed by a company other than the specific company. In the present embodiment, since terminals which are manufactured, sold, or managed by different companies are likely to differ in communication scheme from each other, the description will proceed with this example. In addition, as examples of two terminals having different communication schemes, among terminals manufactured or sold by the same company, a terminal which is new in a manufacturing or selling time is referred to as a "dedicated terminal A", and an old terminal is referred to as a "non-dedicated terminal D".

Each relay device 30 is a computer system that relays call data between the plurality of terminals 10. The call management system 50 is a computer system that performs login authentication from the terminal 10, management of a call status of the terminal 10, management of a destination list, and management of a communication status of the relay device 30 in an integrated fashion. An image of image data may be either or both of a moving image and a still image.

The conversion system 80 undertakes a signaling gateway that performs conversion of a call control signal and a video/audio gateway that performs encoding of call data. In other words, the conversion system 80 is a gateway that performs mutual conversion of a communication scheme of call data transmitted from a request source terminal and a communication scheme (a call control scheme and a coding scheme) of call data transmitted from a destination terminal, and converts at least one of a call control scheme and a coding scheme.

The program providing system 90 is a computer system that provides programs to be used to the terminal 10, the relay device 30, the call management system 50, the conversion system 80, and the maintenance system 100 via the communication network 2, respectively.

The maintenance system 100 is a computer system that performs maintenance, management, or repair of at least one of the terminal 10, the relay device 30, the call management system 50, the conversion system 80, and the program providing system 90. For example, when the maintenance system 100 is installed inside the country, and the terminal 10, the relay device 30, the call management system 50, the conversion system 80, or the program providing system 90 is installed outside the country, the maintenance system 100 remotely performs maintenance, that is, maintenance, management, or repair of at least one of the terminal 10, the relay device 30, the call management system 50, the conversion system 80, and the program providing system 90 via the communication network 2. Further, the maintenance system 100 performs maintenance such as management of a model number, a manufacturing number, a sales destination, a repair check, or a failure history of at least one of the terminal 10, the relay device 30, the call management system 50, the conversion system 80, and the program providing system 90 without the communication network 2.

Next, a first communication pattern for implementing a call between two dedicated terminals A will be described with reference to FIGS. 2 and 3. FIG. 2 is a conceptual diagram illustrating a communication status when a call is implemented between call terminals having the same communication scheme.

Referring to FIG. 2, in the first communication pattern, the call system 1 performs communication of call data using a video coding standard of H.264/SVC. Specifically, in the call system 1, a management communication session sei to transmit and receive various kinds of management information is established between a request source terminal of a dedicated terminal A and a destination terminal of a dedicated terminal A through the call management system 50 as illustrated in FIG. 2. Further, four communication sessions to transmit and receive four pieces of data, that is, high-resolution image data, moderate-resolution image data, low-resolution image data, and audio data through the relay device 30 are established between the request source terminal and the destination terminal.

In FIG. 2, four communication sessions established between the request source terminal and the relay device 30 are represented as a first communication session sed1 for call data. Further, four communication sessions established between the relay device 30 and the destination terminal are represented as a second communication session sed2 for call data.

Here, the resolution of an image of image data handled by the first communication pattern illustrated in FIG. 2 will be described with reference to FIG. 3. FIG. 3 is a conceptual diagram illustrating an image quality of image data transmitted and received according to the SVC standard in FIG. 2.

There are a low-resolution image including 160×120 pixels as illustrated in (a) of FIG. 3 as a base image, a moderate-resolution image including 320×240 pixels as illustrated in (b) of FIG. 3, and a high-resolution image including 640×480 pixels as illustrated in (c) of FIG. 3. Of these, in a narrow band route, low-quality image data including low-resolution image data as a base image is relayed by the relay device 30. However, when a band is relatively broad, moderate-quality image data including low-resolution image data serving as a base image and moderate-resolution image data is relayed by the relay device 30. Further, when a band is extremely broad, high-quality image data including low-resolution image data serving as a base image, moderate-resolution image data, and high-resolution image data is relayed by the relay device 30.

Figure 4:
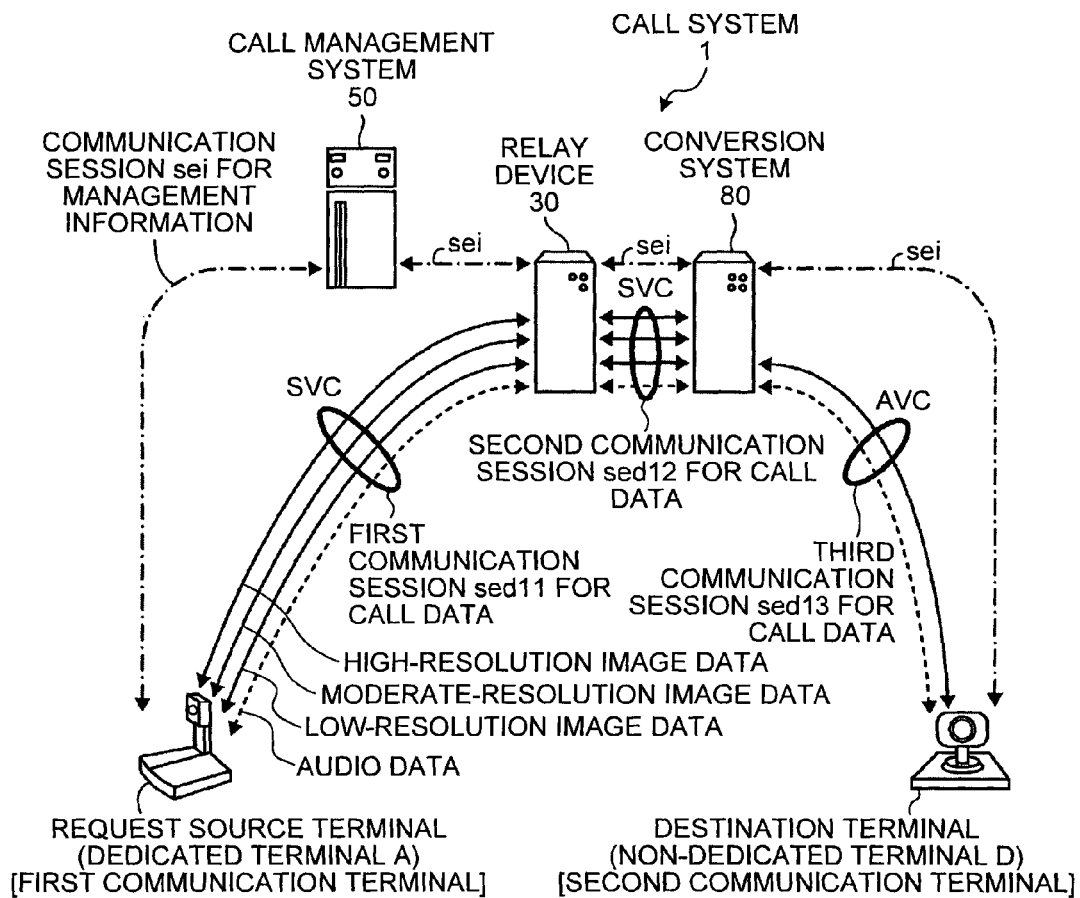
FIG. 4 is a conceptual diagram illustrating a communication status when a call is implemented between call terminals having different communication schemes.

Next, a second communication pattern for implementing a call between a dedicated terminal A and a non-dedicated terminal D will be described with reference to FIGS. 4 and 5. FIG. 4 is a conceptual diagram illustrating a communication status when a call is implemented between call terminals having different communication schemes.

Referring to FIG. 4, in the second communication pattern, the call system 1 performs communication of call data using a video coding standard of H.264/SVC and a video coding standard of H.264/AVC (Advanced Video Coding). Specifically, in the call system 1, a management communication session sei to transmit and receive various kinds of management information is established between a request source terminal of a dedicated terminal A and a destination terminal of a non-dedicated terminal D through the call management system 50 as illustrated in FIG. 4.

Further, four communication sessions to transmit and receive four pieces of data, that is, high-resolution image data, moderate-resolution image data, low-resolution image data, and audio data based on H.264/SVC through the relay device 30 are established between the request source terminal (an example of a first communication terminal) and the conversion system 80. In FIG. 4, four communication sessions established between the request source terminal and the relay device 30 are represented as a first communication session sed11 for call data. Further, four communication sessions established between the relay device 30 and the conversion system 80 are represented as a second communication session sed12 for call data.

Further, two communication sessions to transmit and receive two pieces of data, that is, moderate-resolution image data and audio data based on H.264/AVC are established between the conversion system 80 and the destination terminal (an example of a second communication terminal). In FIG. 4, two communication sessions established between the conversion system 80 and the destination terminal are represented as a third communication session sed13 for call data.

Here, the resolution of an image of image data handled by the second communication pattern illustrated in FIG. 4 will be described with reference to FIGS. 3 and 5. FIG. 5 is a conceptual diagram illustrating an image quality of image data transmitted and received according to the AVC standard in FIG. 4.

In the first communication session sed11 and the second communication session sed12 illustrated in FIG. 4, image data of three resolutions illustrated in (a) to (c) of FIG. 3 are transmitted and received as in the first communication session sed1 and the second communication session sed2 illustrated in FIG. 2. Meanwhile, in the third communication session sed13 illustrated in FIG. 4, moderate-resolution image data illustrated in FIG. 5 is transmitted and received.

Hardware Configuration of Embodiment

Figure 6:
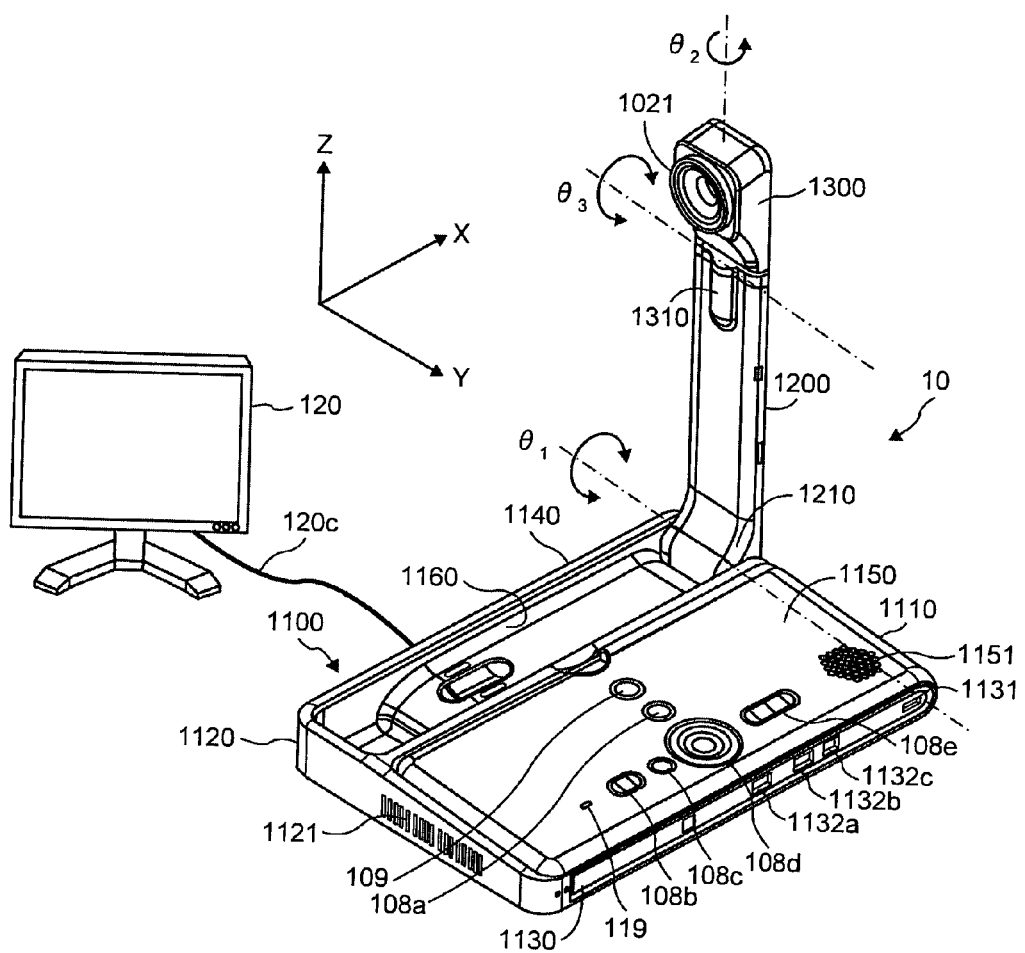
FIG. 6 is an external appearance diagram of a call terminal according to the present embodiment.

Next, a hardware configuration of the present embodiment will be described. FIG. 6 is an external appearance diagram of a call terminal according to the present embodiment. Referring to FIG. 6, the terminal 10 includes a housing 1100, an arm 1200, and a camera housing 1300. Of these, a front sidewall surface 1110 of the housing 1100 is provided with an air intake surface (not illustrated) formed by a plurality of air intake holes, and a rear sidewall surface 1120 of the housing 1100 is provided with an exhaust surface 1121 formed by a plurality of exhaust holes. Thus, as a cooling fan built in the housing 1100 is driven, external air in the rear of the terminal 10 is introduced through the air intake surface (not illustrated), and air is exhausted from the rear of the terminal 10 through the exhaust surface 1121. A sound pick-up hole 1131 is formed on a right sidewall surface 1130 of the housing 1100, and a voice, a sound, a noise, or the like are picked up by a built-in microphone 114 which will be described later.

An operation panel 1150 is formed on the right sidewall surface 1130 of the housing 1100, and the operation panel 1150 is provided with a plurality of operation buttons 108a to 108e, a power supply switch 109, and an alarm lamp 119, which will be described later, and also provided with an output surface 1151 formed by a plurality of audio output holes through which a sound from a built-in speaker 115, which will be described later, is output. An accommodating unit 1160 serving as a concave portion that accommodate the arm 1200 and the camera housing 1300 is formed on a left sidewall surface 1140 side of the housing 1100. The right sidewall surface 1130 of the housing 1100 is provided with a plurality of connection ports 1132a to 1132c used to electrically connect a cable with a display I/F 117 which will be described later. Meanwhile, the left sidewall surface 1140 of the housing 1100 is provided with a connection port (not illustrated) used to eclectically connect a cable 120c for the display 120 to an external device connection I/F 118 which will be described later.

In the following, an arbitrary one of the operation buttons 108a to 108e is referred to as an "operation button 108", and an arbitrary one of the connection ports 1132a to 1132c is referred to as a "connection port 1132".

Next, the arm 1200 is attached to the housing 1100 through a torque hinge 1210, and the arm 1200 is configured to be vertically rotatable with a range of a tilt angle $\theta_1$ of 135° with respect to the housing 1100. FIG. 6 illustrates a state in which the tilt angle $\theta_1$ is 90°. A built-in camera 112 is disposed in the camera housing 1300, and can image the user, a document, a room, or the like. The camera housing 1300 is provided with a torque hinge 1310. The camera housing 1300 is attached to the arm 1200 through the torque hinge 1310. Further, the camera housing 1300 is configured to be horizontally rotatable in a range of a pan angle of $\theta_2$ of ±180° with respect to the arm 1200 and vertically rotatable in a range of a tilt angle $\theta_3$ of ±45° with respect to the arm 1200 when the state illustrated in FIG. 6 is 0°.

Each of the relay device 30, the call management system 50, the conversion system 80, the program providing system 90, and the maintenance system 100 has the same external appearance as a general server computer, and thus a description thereof will not be made.

Figure 7:
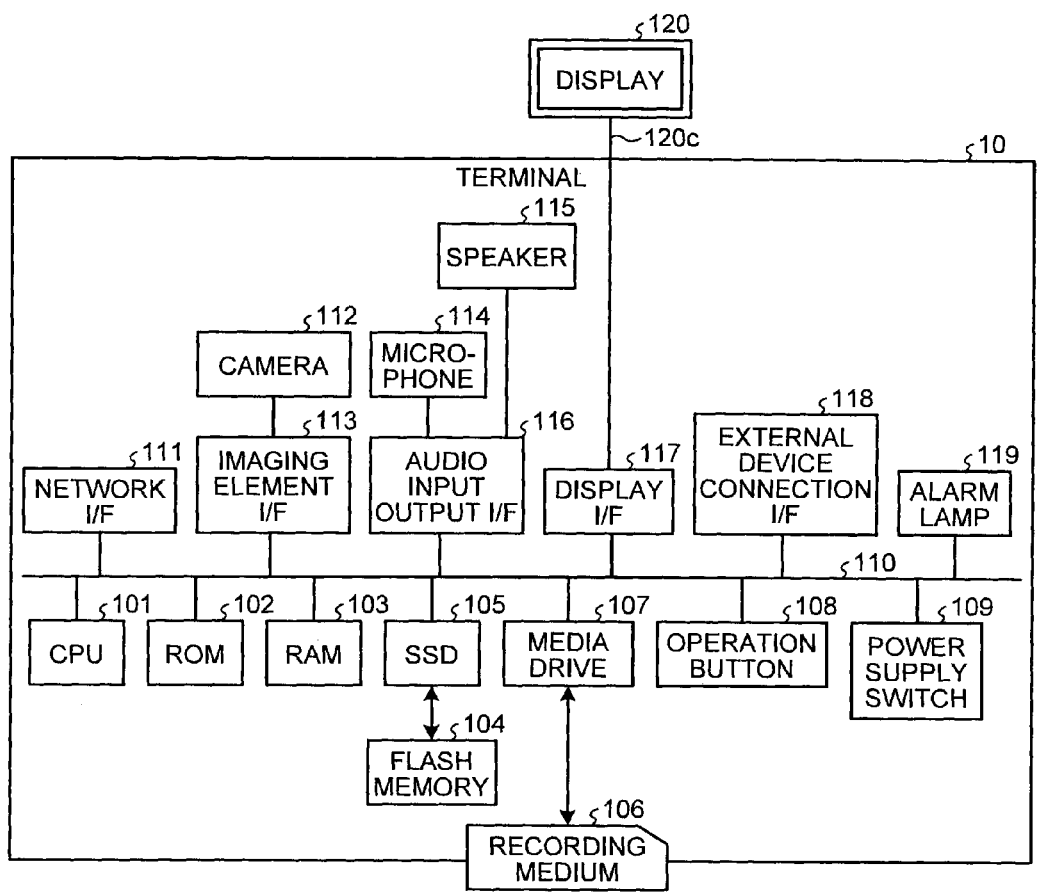
FIG. 7 is a hardware configuration diagram of a call terminal according to the present embodiment.

FIG. 7 is a hardware configuration diagram of a terminal according to the present embodiment. As illustrated in FIG. 7, the terminal 10 according to the present embodiment includes a central processing unit (CPU) 101 that controls an operation of the terminal 10 in general, a read only memory (ROM) 102 that stores a program used to drive the CPU 101 such as an initial program loader (IPL), a random access memory (RAM) 103 used as a work area of the CPU 101, a flash memory 104 that stores various kinds of data such as a program for the terminal 10, image data, and audio data, a solid state drive (SSD) 105 that controls reading or writing of various kinds of data on the flash memory 104 according to control of the CPU 101, a media drive 107 that controls reading or writing (storing) of data on a recording medium 106 such as a flash memory, the operation button 108 operated to select a destination of the terminal 10, the power supply switch 109 used to power on or off the terminal 10, and a network I/F 111 used to transmit data using the communication network 2.

Figure 5:
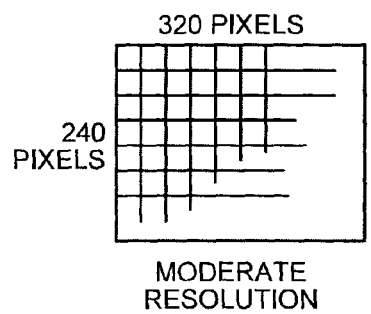
FIG. 5 is a conceptual diagram illustrating image quality of image data transmitted and received according to an AVC standard in FIG. 4.

Further, the terminal 10 includes the built-in camera 112 that images a subject according to control of the CPU 101 and obtains image data, an imaging element I/F 113 that controls driving of the camera 112, the built-in microphone 114 that receives a sound, the built-in speaker 115 that outputs a sound, an audio input output I/F 116 that processes an input and an output of an audio signal between the microphone 114 and the speaker 115 according to control of the CPU 101, the display I/F 117 that transmits image data to the external display 120 according to control of the CPU 101, the external device connection I/F 118 used to connect various kinds of external devices, the alarm lamp 119 that notifies of abnormality of various kinds of functions of the terminal 10, and a bus line 110 such as an address bus or a data bus used to electrically connect the above-mentioned components as illustrated in FIG. 5.

The display 120 is a display unit configured with a liquid crystal display (LCD) device or an organic EL device that displays a subject image, an operation icon, or the like. The display 120 is connected to the display I/F 117 through the cable 120c. The cable 120c may be a cable for an analog RGB (VGA) signal, a cable for a component video, or a cable for high-definition multimedia interface (HDMI) or digital video interface (DVI).

The camera 112 includes a lens and a solid-state imaging element that converts light into electric charges and digitizes a subject image (video), and a complementary metal oxide semiconductor (CMOS), a charge coupled device (CCD), or the like is used as the solid-state imaging element.

An external device such as an external camera, an external microphone, and an external speaker may be electrically connected to the external device connection I/F 118 through a universal serial bus (USB) cable inserted into the connection port 1132 of the housing 1100 illustrated in FIG. 6. When the external camera is connected, the external camera takes priority over the built-in camera 112 and is driven according to control of the CPU 101. Similarly, when the external microphone is connected or when the external speaker is connected, the external microphone or the external speaker takes priority over the built-in microphone 114 or the built-in speaker 115 and is driven according to control of the CPU 101.

The recording medium 106 is configured to be removably attached to the terminal 10. As long as non-volatile memory that performs reading or writing of data according to control of the CPU 101, the recording medium 106 is not limited to the flash memory 104 and may include electrically erasable and programmable ROM (EEPROM) or the like.

Figure 8:
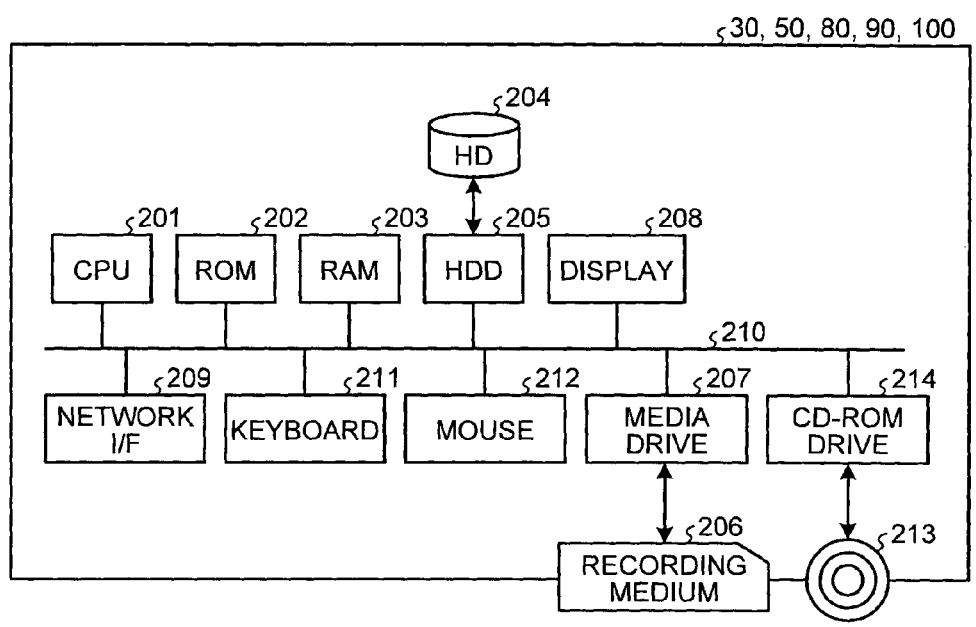
FIG. 8 is a hardware configuration diagram of a call management system, a relay device, a conversion system, a program providing system, or a maintenance system according to the present embodiment.

FIG. 8 is a hardware configuration diagram of a management system according to the present embodiment of the present invention. The call management system 50 includes a CPU 201 that controls an operation of the call management system 50 in general, a ROM 202 that stores a program used for driving of the CPU 201 such as an IPL, a RAM 203 used as a work area of the CPU 201, and a hard disk (HD) 204 that stores various kinds of data such as a program for the call management system 50, a hard disk drive (HDD) 205 that controls reading or writing of various kinds of data on the HD 204 according to control of the CPU 201, a media drive 207 that controls reading or writing (storing) of data on a recording medium 206 such as a flash memory, a display 208 that displays various kinds of information such as a cursor, a menu, a window, a text, or an image, a network I/F 209 that performs data communication via the communication network 2, a keyboard 211 including a plurality of keys used to input a text, a digit, various kinds of instructions, or the like, a mouse 212 used to select or execute various kinds of instructions, select a processing target, or move a cursor, a CD-ROM drive 214 that controls reading or writing of various kinds of data on a compact disc read only memory (CD-ROM) 213 as an example of a removable recording medium, and a bus line 210 such as an address bus or a data bus used to electrically connect the above-mentioned components as illustrated in FIG. 8.

Meanwhile, the relay device 30, the conversion system 80, the program providing system 90, and the maintenance system 100 have the same hardware configuration as the call management system 50, and thus a description thereof will not be made. However, each HD 204 stores various kinds of data such as a program that controls each of the relay device 30, the conversion system 80, the program providing system 90, and the maintenance system 100.

The programs for the terminal 10, the relay device 30, the conversion system 80, the program providing system 90, and the maintenance system 100 may be recorded in a computer readable recording medium (the recording medium 106 or the like) as a file of an installable format or an executable form, and distributed. As another example of the recording medium, there are a compact disc recordable (CD-R), a digital versatile disk (DVD), a Blu-ray disc, and the like.

Functional Configuration of Embodiment

Figure 9:
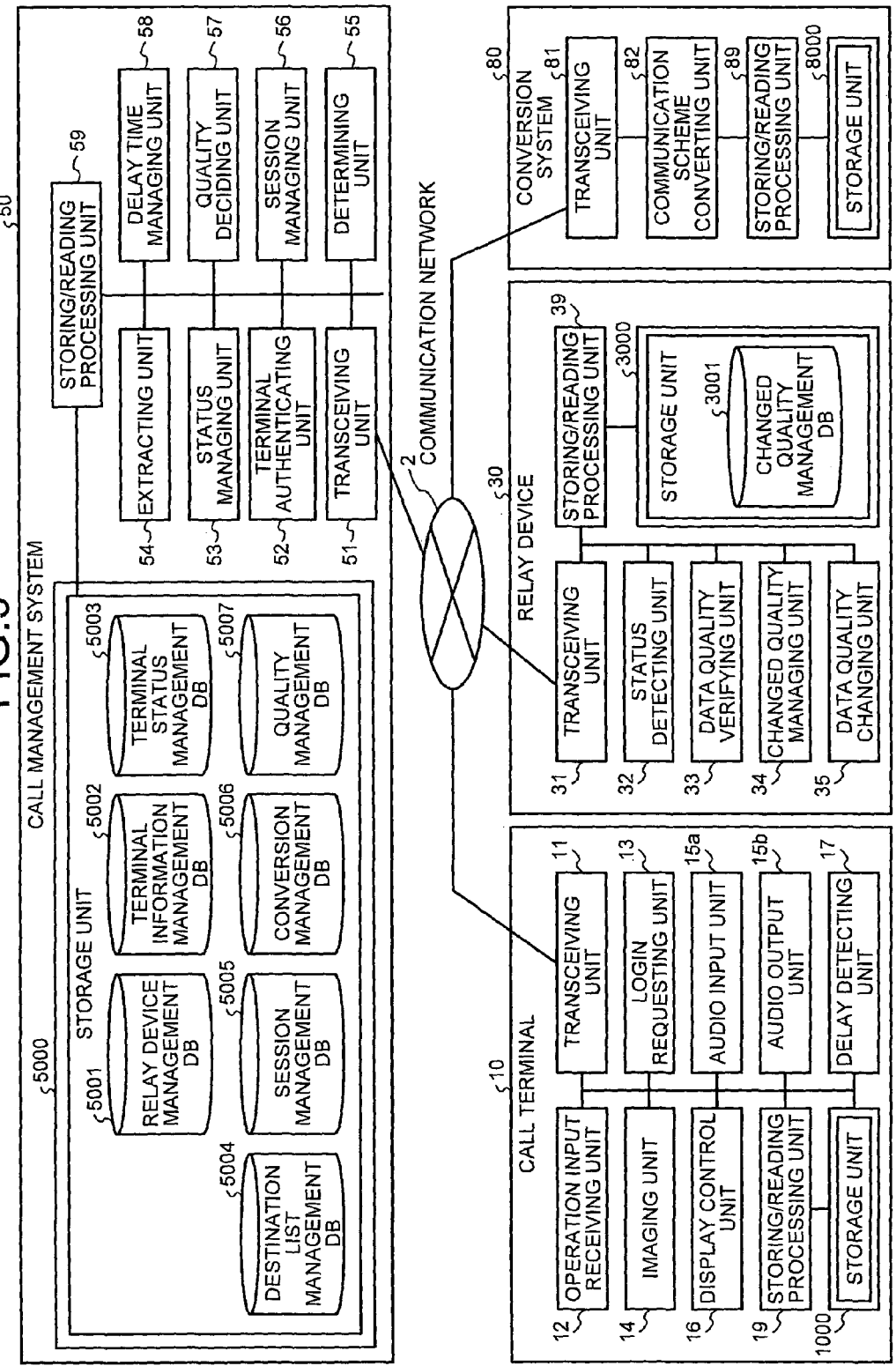
FIG. 9 is a functional block diagram of a call terminal, a relay device, a call management system, and a conversion system that configure a part of a call system according to an embodiment.

Next, a functional configuration of the present embodiment will be described. FIG. 9 is a functional block diagram of the terminal 10, the relay device 30, the call management system 50, and the conversion system 80 that configure a part of the call system 1 according to the present embodiment. Referring to FIG. 9, the terminal 10, the relay device 30, the call management system 50, and the conversion system 80 are connected to perform data communication with one another via the communication network 2.

Functional Configuration of Terminal

The terminal 10 includes a transceiving unit 11, an operation input receiving unit 12, a login requesting unit 13, an imaging unit 14, an audio input unit 15a, an audio output unit 15b, a display control unit 16, a delay detecting unit 17, and a storing/reading processing unit 19. Each unit is any one of the components illustrated in FIG. 7 and is a function or a device that is operated and implemented according to an instruction from the CPU 101 that follows a program for the terminal 10 developed from the flash memory 104 onto the RAM 103. Further, the terminal 10 includes a storage unit 1000 that is constructed by the RAM 103 illustrated in FIG. 7 and the flash memory 104 illustrated in FIG. 7.

Each Functional Configuration of Terminal

Next, each functional configuration of the terminal 10 will be described in detail with reference to FIGS. 7 and 9. In the following, when each functional configuration of the terminal 10 is described, a relation with a main component for implementing each functional configuration of the terminal 10 among the components illustrated in FIG. 7 will be also described.

The transceiving unit 11 of the terminal 10 illustrated in FIG. 9 is implemented by the network I/F 111 illustrated in FIG. 7 according to an instruction from the CPU 101 illustrated in FIG. 7, and transmits or receives various kinds of data (or information) to or from another terminal, device, or system via the communication network 2. The transceiving unit 11 starts to receive each piece of status information representing a status of each terminal serving a destination candidate through the call management system 50 before starting a call with a desired destination terminal. The status information represents not only an operation status (an online status or an offline status) of each terminal 10 but also a detailed status representing whether each terminal 10 is available or busy, or whether or not the user has left his/her seat even though each terminal 10 is online. Further, the status information represents not only the operation status of each terminal 10 but also various statuses such as a status representing that the cable 120c is removed from the terminal 10, a status in which a sound is output but an image is not output, and a status (MUTE) in which a sound is not output. The following description will proceed with an example in which the status information represents the operation status.

The operation input receiving unit 12 is implemented by the operation button 108 and the power supply switch 109 illustrated in FIG. 7 according to an instruction from the CPU 101 illustrated in FIG. 7, and receives various kinds of inputs made by the user. For example, when the user turned on the power supply switch 109 illustrated in FIG. 7, the operation input receiving unit 12 illustrated in FIG. 9 receives a power-on input and turns on power.

The login requesting unit 13 is implemented according to an instruction from the CPU 101 illustrated in FIG. 7, and automatically transmits login request information to request a login and a current IP address of the request source terminal from the transceiving unit 11 to the call management system 50 via the communication network 2 when the power-on input is received. Further, when the user turned off the power supply switch 109 that is in an on state, the transceiving unit 11 transmits status information representing power off to the call management system 50, and then the operation input receiving unit 12 completely turned off the power. Thus, the call management system 50 side can detect that the terminal 10 has transitioned from the power-on state to the power-off state.

The imaging unit 14 is implemented by the camera 112 and the imaging element I/F 113 illustrated in FIG. 7 according to an instruction from the CPU 101 illustrated in FIG. 7, and images a subject and outputs obtained image data.

The audio input unit 15a is implemented by the audio input output I/F 116 illustrated in FIG. 7 according to an instruction from the CPU 101 illustrated in FIG. 7, and converts the user's sound into an audio signal through the microphone 114 and receives audio data related to the audio signal. The audio output unit 15b is implemented by the audio input output I/F 116 illustrated in FIG. 7 according to an instruction from the CPU 101 illustrated in FIG. 7, and outputs an audio signal related to audio data to the speaker 115 and outputs a sound from the speaker 115.

The display control unit 16 is implemented by the display I/F 117 illustrated in FIG. 7 according to an instruction from the CPU 101 illustrated in FIG. 7, and performs control such that received image data having different resolutions are combined and combined image data will be transmitted to the display 120 as will be described later. The display control unit 16 can cause the destination list to be displayed on the display 120 by transmitting information of the list received from the call management system 50 to the display 120.

The delay detecting unit 17 is implemented according to an instruction from the CPU 101 illustrated in FIG. 7, and detects a delay time (ms) of image data or audio data transmitted from another terminal 10 through the relay device 30.

The storing/reading processing unit 19 is implemented by the SSD 105 illustrated in FIG. 7 according to an instruction from the CPU 101 illustrated in FIG. 7 or is implemented according to an instruction from the CPU 101, and performs a process of storing various kinds of data in the storage unit 1000 or reading various kinds of data stored in the storage unit 1000. The storage unit 1000 stores terminal identification (ID) used to identify the terminal 10, a password, and the like. Further, image data and audio data received when a call with the destination terminal is performed are overwritten and stored in the storage unit 1000 each time image data and audio data are received. Of these, an image is displayed on the display 120 based on image data which is not overwritten, and a sound is output from the speaker 115 based on audio data that is not overwritten.

The terminal ID and a relay device ID (which will be described later) of the present embodiment represent identification information, such as a language, a text, a symbol, or a sign, which is used to uniquely identify the terminal 10 and the relay device 30, respectively. The terminal ID and the relay device ID may be identification information in which at least two of a language, a text, a symbol, and a sign are combined.

<Functional Configuration of Relay Device>

The relay device 30 includes a transceiving unit 31, a status detecting unit 32, a data quality verifying unit 33, a changed quality managing unit 34, a data quality changing unit 35, and a storing/reading processing unit 39. Each unit is any one of the components illustrated in FIG. 8 and is a function or a device that is operated and implemented according to an instruction from the CPU 201 that follows a program for the relay device 30 developed from the HD 204 onto the RAM 203. Further, the relay device 30 includes a storage unit 3000 that is constructed by the RAM 203 illustrated in FIG. 8 and the HD 204 illustrated in FIG. 8.

Changed Quality Management Table

FIG. 10 is a conceptual diagram illustrating a changed quality management table. In the storage unit 3000, a changed quality management database (DB) 3001 configured with a changed quality management table illustrated in FIG. 10 is constructed. In the changed quality management table, an IP address of the terminal 10 serving as a relay destination (destination) of image data is managed in association with an image quality of image data which is relayed to this relay destination by the relay device 30.

Each Functional Configuration of Relay Device

Next, each functional configuration of the relay device 30 will be described in detail. In the following, when each functional configuration of the relay device 30 is described, a relation with a main component for implementing each functional configuration of the relay device 30 among the components illustrated in FIG. 8 will be also described.

The transceiving unit 31 of the relay device 30 illustrated in FIG. 9 is implemented by the network I/F 209 illustrated in FIG. 8 according to an instruction from the CPU 201 illustrated in FIG. 8, and transmits or receives various kinds of data (or information) to or from another terminal, device, or system via the communication network 2. The transceiving unit 31 performs initialization of a communication session in an own device.

Further, the transceiving unit 31 transmits session start instruction information to instruct a start of a communication session (a first communication session) to a destination represented by an IP address of the request source terminal among IP addresses received by the transceiving unit 31. Further, the transceiving unit 31 transmits session start instruction information to instruct a start of a communication session (a second communication session) and an IP address of the destination terminal to a destination represented by an IP address of the conversion system 80 among IP addresses received by the transceiving unit 31.

The status detecting unit 32 is implemented according to an instruction from the CPU 201 illustrated in FIG. 8, and detects the operation status of the relay device 30 having the status detecting unit 32. As the operation status, there are an "online" state, an "offline" state, a "busy" state, and a "temporary stop" state.

The data quality verifying unit 33 is implemented according to an instruction from the CPU 201 illustrated in FIG. 8, and verifies an image quality of image data to be relayed by searching the changed quality management table (see FIG. 10) using the IP address of the destination terminal as a search key and extracting an image quality of corresponding image data to be relayed.

The changed quality managing unit 34 is implemented according to an instruction from the CPU 201 illustrated in FIG. 8, and changes content of the changed quality management table (see FIG. 10) based on quality information (which will be described later) transmitted from the call management system 50. For example, while a video conference is being performed such that high-quality image data is transmitted and received between the request source terminal (the terminal 10aa) having the terminal ID of "01aa" and the destination terminal (the terminal 10ba) having the terminal ID of "01ba", when the request source terminal (the terminal 10bb) and the destination terminal (the terminal 10ca), which perform another video conference, start a video conference via the communication network 2 and thus image data is received with a delay by the destination terminal (the terminal 10ba), the relay device 30 lowers an image quality of image data received until now from a high image quality to a moderate image quality. In this case, content of the changed quality management table (see FIG. 10) is changed based on the quality information represented by the moderate image quality such that an image quality of image data to be relayed by the relay device 30 is lowered from the high image quality to the moderate image quality.

The data quality changing unit 35 is implemented according to an instruction from the CPU 201 illustrated in FIG. 8, an image quality of image data transmitted from a transmission source terminal is changed based on the changed content of the changed quality management table (see FIG. 10).

The storing/reading processing unit 39 is implemented by the HDD 205 illustrated in FIG. 8 according to an instruction from the CPU 201 illustrated in FIG. 8, and performs a process of storing various kinds of data in the storage unit 3000 or reading various kinds of data stored in the storage unit 3000.

Functional Configuration of Management System

The call management system 50 includes a transceiving unit 51, a terminal authenticating unit 52, a status managing unit 53, an extracting unit 54, a determining unit 55, a session managing unit 56, a quality deciding unit 57, a delay time managing unit 58, and a storing/reading processing unit 59. Each unit is any one of the components illustrated in FIG. 8 and is a function or a device that is operated and implemented according to an instruction from the CPU 201 that follows a program for the call management system 50 developed from the HD 204 onto the RAM 203. Further, the call management system 50 includes a storage unit 5000 that is constructed by the HD 204 illustrated in FIG. 8.

Relay Device Management Table

FIG. 11 is a conceptual diagram illustrating a relay device management table. In the storage unit 5000, a relay device management DB 5001 configured with a relay device management table illustrated in FIG. 11 is constructed. In the relay device management table, an operation status of each relay device 30, a reception date and time in which status information represented by the operation status is received by the call management system 50, an IP address of the relay device 30, and a maximum data call rate (Mbps) in the relay device 30 are managed in association with the relay device ID of each relay device 30. For example, the relay device management table illustrated in FIG. 11 represents that the operation status of a relay device 30a having the relay device ID of "111a" is "online", a date and time in which the status information is received by the call management system 50 is "13:00, Nov. 10, 2011", the IP address of the relay device 30a is "1.2.1.2", and the maximum data call rate in the relay device 30a is 100 Mbps.

Terminal Information Management Table

FIG. 12 is a conceptual diagram illustrating a terminal information management table. In the storage unit 5000, a terminal information management DB 5002 configured with a terminal information management table illustrated in FIG. 12 is constructed. In the terminal information management table, a password for authentication, a model number of the terminal 10, a serial number of the terminal 10, and a communication scheme of the terminal 10 are managed in association with each terminal ID of each of all terminals 10 managed by the call management system 50. For example, the terminal information management table illustrated in FIG. 12 represents that a terminal ID of a terminal 10aa is "01aa", a password is "aaaa", a model number is "9001", a serial number is "2001", and a communication scheme is "dedicated".

A communication scheme represented as "dedicated" is a communication scheme used by the dedicated terminal A illustrated in FIGS. 2 and 4. A communication scheme represented as "non-dedicated 1" is a communication scheme used by the non-dedicated terminal D illustrated in FIG. 4. Further, a communication scheme represented as "non-dedicated 2" is a communication scheme other than communication schemes which are respectively used by the dedicated terminal A and the non-dedicated terminal D.

Terminal Status Management Table

FIG. 13 is a conceptual diagram illustrating a terminal status management table. In the storage unit 5000, a terminal status management DB 5003 configured with a terminal status management table illustrated in FIG. 13 is constructed. In the terminal status management table, a terminal name of each terminal 10 set as a destination, an operation status of each terminal 10, a reception date and time in which login request information (which will be described later) is received by the call management system 50, and an IP address of the terminal 10 are managed in association with the terminal ID of each terminal 10. For example, the terminal status management table illustrated in FIG. 13 represents that a terminal name of a terminal 10aa having the terminal ID of "01aa" is "AA terminal of Tokyo business office in Japan", the operation status is "online (call possible state)", a date and time in which login request information is received by the call management system 50 is "13:40, Nov. 10, 2011", and the IP address of the terminal 10aa is "1.2.1.3".

However, in the terminal status management table, the IP address of the terminal 10 other than the dedicated terminal A, that is, the IP address of the non-dedicated terminal D or the like is not a management target and thus not managed.

Destination List Management Table

FIG. 14 is a conceptual diagram illustrating a destination list management table. In the storage unit 5000, a destination list management DB 5004 configured with a destination list management table illustrated in FIG. 14 is constructed. In the destination list management table, terminals ID of destination terminals that are registered as a destination terminal candidate are managed in association with a terminal ID of a request source terminal that requests a start of a call. For example, the destination list management table illustrated in FIG. 14 represents that destination terminal candidates that can request a start of a call from a request source terminal (a terminal 10aa) having the terminal ID of "01aa" are a terminal 10ab having the terminal ID of "01ab", a terminal 10ba having the terminal ID of "01ba", and a terminal 10bb having the terminal ID of "01bb". As an arbitrary request source terminal requests the call management system 50 to add or delete, the destination terminal candidate is added or deleted and updated. In the terminal status management table (see FIG. 13), the IP address of the terminal 10 other than the dedicated terminal A is a management target, but in the destination list management table (see FIG. 14), the terminal ID of the terminal 10 other than the dedicated terminal A is a management target.

Session Management Table

FIG. 15 is a conceptual diagram illustrating a session management table. In the storage unit 5000, a session management DB 5005 configured with a session management table illustrated in FIG. 15, is constructed. In the session management table, the relay device ID of the relay device 30 used to relay image data and audio data, the terminal ID of the request source terminal, the terminal ID of the destination terminal, a reception delay time (ms) when image data is received in the destination terminal, and a reception date and time in which delay time information representing the delay time is transmitted from the destination terminal and received by the call management system 50 are managed in association with one another. For example, the session management table illustrated in FIG. 15 represents that the relay device 30a (the relay device ID "111a") relays image data and audio data between the request source terminal (a terminal 10aa) having the terminal ID "01aa" and the destination terminal (a terminal 10ca) having the terminal ID of "01ca", and the delay time of image data at "14:00, Nov. 10, 2011" in the destination terminal (the terminal 10ca) is 200 (ms). Further, when a call is performed between the two terminals 10, the reception date and time of the delay time information may be managed based on the delay time information transmitted from the request source terminal other than the destination terminal. However, when a call is performed between three or more terminals 10, the reception date and time of the delay time information is managed based on the delay time information transmitted from the terminal 10 at the reception side of image data and audio data.

Conversion Management Table

FIG. 16 is a conceptual diagram illustrating a conversion management table. In the storage unit 5000, a conversion management DB 5006 configured with a conversion management table illustrated in FIG. 16 is constructed. In the conversion management table, the terminal ID of the non-dedicated terminal (including terminals of non-dedicated 1 and non-dedicated 2), the IP address of the conversion system 80, and the IP address of the non-dedicated terminal are managed in association with one another.

Quality Management Table

FIG. 17 is a conceptual diagram illustrating a quality management table. In the storage unit 5000, a quality management DB 5007 configured with a quality management table illustrated in FIG. 17 is constructed. In the quality management table, the delay time information representing the delay time of image data and image quality information representing an image quality of image data (a quality of an image) are managed in association with each other such that as the delay time (ms) of image data the request source terminal or the destination terminal increases, an image quality of image data to be relayed by the relay device 30 decreases.

Each Functional Configuration of Management System

Next, each functional configuration of the call management system 50 will be described in detail. In the following, when each functional configuration of the call management system 50 is described, a relation with a main component for implementing each functional configuration of the call management system 50 among the components illustrated in FIG. 8 will be also described.

The transceiving unit 51 is implemented by the network I/F 209 illustrated in FIG. 8 according to an instruction from the CPU 201 illustrated in FIG. 8, and transmits or receives various kinds of data (or information) to or from another terminal, device, or system via the communication network 2.

The terminal authenticating unit 52 is implemented according to an instruction from the CPU 201 illustrated in FIG. 8, searches the terminal information management table (see FIG. 12) using the terminal ID and the password included in the login request information received through the transceiving unit 51 as the search key, and performs terminal authentication by determining whether or not the same terminal ID and password are managed in the terminal information management table.

The status managing unit 53 is implemented according to an instruction from the CPU 201 illustrated in FIG. 8, and manages the terminal ID of the request source terminal, the operation status of the request source terminal, the reception date and time in which login request information is received by the call management system 50, and the IP address of the request source terminal to be stored in the terminal status management table (see FIG. 13) in association with one another in order to manage the operation status of the request source terminal that has made the login request. Further, when the user switches the power supply switch 109 of the terminal 10 from an on state to an off state, the status managing unit 53 changes the operation status of the terminal status management table (see FIG. 13) representing the online state to the offline state based on the status information representing the power off transmitted from the terminal 10.

The extracting unit 54 is implemented according to an instruction from the CPU 201 illustrated in FIG. 8, and searches each management DB constructed in the storage unit 5000 using various kinds of search keys and extracts data (information) corresponding to the search keys as a search result.

For example, the extracting unit 54 searches the destination list management table (see FIG. 14) using the terminal ID of the request source terminal that has made the login request as a key, and extracts the terminal ID of the destination terminal candidate that can perform a call with the request source terminal. Further, the extracting unit 54 searches the terminal status management table (see FIG. 13) using the terminal ID of the destination terminal candidate as the search key and extracts the operation status for each terminal ID. Thus, the extracting unit 54 can acquire the operation status of the destination terminal candidate that can perform a call with the request source terminal that has made the login request.

Further, the extracting unit 54 searches the destination list management table (see FIG. 14) using the terminal ID of the request source terminal that has made the login request as a key, and extracts the terminal ID of another request source terminal in which the terminal ID of the request source terminal is registered as the destination terminal candidate. Further, the extracting unit 54 searches the terminal status management table (see FIG. 13) using the terminal ID as the search key, and acquires the operation status of the request source terminal that has made the login request.

Further, the extracting unit 54 searches the terminal status management table (see FIG. 13) using the terminal ID of the terminal 10 received by the transceiving unit 51 as the search key, and extracts the IP address of the corresponding terminal 10. Further, the extracting unit 54 searches the terminal information management table (see FIG. 12) using the terminal ID of the terminal 10 received by the transceiving unit 51 as the search key, and extracts corresponding communication scheme information. Further, the extracting unit 54 searches the conversion management table (see FIG. 16) using the terminal ID of the terminal 10 received by the transceiving unit 51 as the search key, and extracts the IP address of the corresponding conversion system 80 and the IP address of the terminal 10 related to the received terminal ID.

Further, the extracting unit 54 searches the quality management table (see FIG. 17) using the delay time information received by the transceiving unit 51 as the search key, and extracts image quality information of corresponding image data.

Further, the extracting unit 54 searches the terminal status management table (see FIG. 13) using the IP address of the destination terminal as the search key, and extracts the corresponding terminal ID.

Next, the determining unit 55 is implemented according to an instruction from the CPU 201 illustrated in FIG. 8, and determines whether or not the communication scheme used by the terminal 10 is the communication scheme used by the dedicated terminal A.

The session managing unit 56 is implemented according to an instruction from the CPU 201 illustrated in FIG. 8, and manages the relay device ID of the relay device 30 used to relay call data, the terminal ID of the request source terminal, the terminal ID of the destination terminal, the reception delay time (ms) when image data is received by the destination terminal, and a reception date and time in which the delay time information representing the delay time is transmitted from the destination terminal and received by the call management system 50 to be stored in the session management table (see FIG. 15) of the storage unit 5000 in association with one another. Further, the session managing unit 56 generates a session ID used to establish a communication session.

The quality deciding unit 57 decides an image quality of image data to be relayed by the relay device 30 based on the image quality information of image data extracted by the extracting unit 54.

The delay time managing unit 58 is implemented according to an instruction from the CPU 201 illustrated in FIG. 8, and manages the delay time represented by the delay time information to be stored in a delay time field portion of a record including a terminal ID extracted by the extracting unit 54 in the session management table of the session management DB 5005 (see FIG. 15).

The storing/reading processing unit 59 is implemented by the HDD 205 illustrated in FIG. 8 according to an instruction from the CPU 201 illustrated in FIG. 8, and performs a process of storing various kinds of data in the storage unit 5000 or reading various kinds of data stored in the storage unit 5000.

Functional Configuration of Conversion System

The conversion system 80 includes a transceiving unit 81, a communication scheme converting unit 82, and a storing/reading processing unit 89. Each unit is any one of the components illustrated in FIG. 8 and is a function or a device that is operated and implemented according to an instruction from the CPU 201 that follows a program for the conversion system 80 developed from the HD 204 onto the RAM 203. Further, the conversion system 80 includes a storage unit 8000 that is constructed by the RAM 203 illustrated in FIG. 8 and/or the HD 204 illustrated in FIG. 8. The storage unit 8000 stores conversion rule data used to convert communication data.

Functional Configuration of Conversion System

Next, each functional configuration of the conversion system 80 will be described with reference to FIGS. 8 and 9. In the following, when each functional configuration of the conversion system 80 is described, a relation with a main component for implementing each functional configuration of the conversion system 80 among the components illustrated in FIG. 8 will be also described.

The transceiving unit 81 of the conversion system 80 illustrated in FIG. 9 is implemented by the network I/F 209 illustrated in FIG. 8 according to an instruction from the CPU 201 illustrated in FIG. 8, and transmits or receives various kinds of data (or information) to or from another terminal, device, or system via the communication network 2. Further, the transceiving unit 81 transmits session start instruction information to instruct a start of a communication session (a third communication session) to a destination represented by destination information transmitted by the relay device 30. In addition, an IP address, a uniform resource identifier (URI), or the like may be used as the destination information.

The communication scheme converting unit 82 mutually converts a communication scheme of call data transmitted from the request source terminal and communication scheme of call data transmitted from the destination terminal based on communication scheme conversion rule data stored in the storage unit 8000.

The storing/reading processing unit 89 is implemented by the HDD 205 illustrated in FIG. 8 according to an instruction from the CPU 201 illustrated in FIG. 8, and performs a process of storing various kinds of data in the storage unit 8000 or reading various kinds of data stored in the storage unit 8000.

Process and Operation of Embodiment

Figure 18:
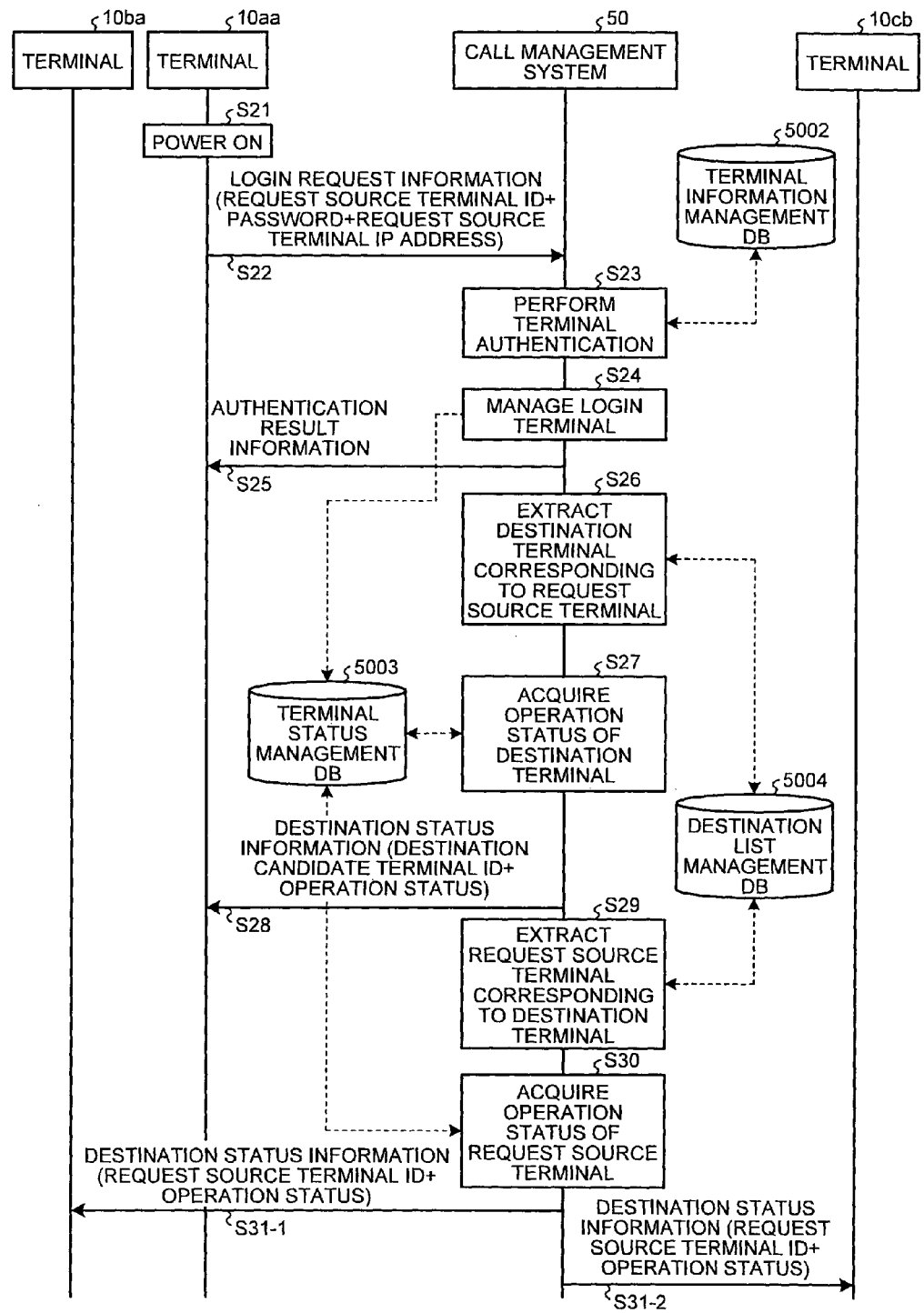
FIG. 18 is a sequence diagram illustrating a process of a preliminary step to start a call between terminals.

Next, the first communication pattern in which a call is performed between the two dedicated terminals A will be described with reference to FIGS. 18 to 25. Specifically, the description will proceed with an example a call is performed between the terminal 10aa serving as the dedicated terminal A and the terminal 10ca serving as the dedicated terminal A. FIG. 18 is a sequence diagram illustrating a process of a preliminary step to start a call between terminals. In FIG. 18, various kinds of pieces of management information are transmitted and received according to the management communication session sei illustrated in FIG. 2.

First, when the user turns on the power supply switch 109 illustrated in FIGS. 6 and 7, the operation input receiving unit 12 illustrated in FIG. 9 receives the power-on input and turns on the power as illustrated in FIG. 18 (step S21). Then, when the power-on input is received, the login requesting unit 13 automatically transmits login request information representing a login request to the call management system 50 via the communication network 2 through the transceiving unit 11 (step S22). The login request information includes a terminal ID used to identify an own device serving as the request source terminal (the terminal 10aa) and a password. The terminal ID and the password are data which is read from the storage unit 1000 through the storing/reading processing unit 19 and transmitted to the transceiving unit 11. Further, when the login request information is transmitted from the request source terminal (the terminal 10aa) to the call management system 50, the call management system 50 at the reception side can detect the IP address of the request source terminal (the terminal 10aa) at the transmission side.

Next, the terminal authenticating unit 52 of the call management system 50 searches the terminal information management table (see FIG. 12) using the terminal ID and the password included in the login request information received through the transceiving unit 51 as the search key, and performs terminal authentication by determining whether or not the same terminal ID and password are managed in the terminal information management DB 5002 (step S23). Since the same terminal ID and password are managed by the terminal authenticating unit 52, when it is determined that there is a login request from the terminal 10 having an appropriate right of usage, the status managing unit 53 stores the terminal ID of the request source terminal (the terminal 10aa), the operation status, the reception date and time in which login request information is received, and the IP address of the request source terminal (the terminal 10aa) in the terminal status management table (see FIG. 13) in association with one another (step S24). Thus, in the terminal status management table (see FIG. 13), the operation status "online", the reception date and time "2011.11.10.13:40", and the IP address "1.2.1.3" of the request source terminal (the terminal 10aa) are managed in associated with one another using the terminal ID "01aa".

Then, the transceiving unit 51 of the call management system 50 transmits authentication result information representing the authentication result obtained by the terminal authenticating unit 52 to the request source terminal (the terminal 10aa) that has made the login request via the communication network 2 (step S25). In the present embodiment, the description will proceed with an example in which the terminal authenticating unit 52 determines that the terminal 10 has an appropriate right of usage.

The extracting unit 54 of the call management system 50 searches the destination list management table (see FIG. 14) using the terminal ID "01aa" of the request source terminal (the terminal 10*aa*) that has made the login request as the search key, and extracts the terminal ID of the destination terminal candidate that can perform communication with the request source terminal (the terminal 10*aa*) (step S26). Here, the terminal IDs ("01*ab*", "01*ba*", . . . ) of the destination terminals (the terminals 10*ab*, 10*ba*, . . . ) corresponding to the terminal ID "01*aa*" of the request source terminal (the terminal 10*aa*) are assumed to be extracted.

Next, the extracting unit 54 searches the terminal status management table (see FIG. 13) using the terminal IDs ("01*ab*", "01*ba*", . . . ) of the destination terminal candidate extracted in step S26 as the search key and acquires the operation statuses of the terminals (10*ab*, 10*ba*, . . . ) by reading the operation status ("offline", "online", . . . ) of each terminal ID (step S27).

Next, the transceiving unit 51 transmits destination status information including the terminal IDs ("01*ab*", "01*ba*", . . . ) used in step S27 as the search key and the operation status ("offline", "online", . . . ) of the corresponding destination terminals (the terminals 10*ab*, 10*ba*, . . . ) to the request source terminal (the terminal 10*aa*) via the communication network 2 (step S28). Thus, the request source terminal (the terminal 10*aa*) can detect the current operation statuses ("offline", "online", . . . ) of the terminals (10*ab*, 10*ba*, . . . ) serving as the destination terminal candidate that can perform communication with the request source terminal (the terminal 10*aa*).

Further, the extracting unit 54 searches the destination list management table (see FIG. 14) using the terminal ID "01*aa*" of the request source terminal (the terminal 10*aa*) that has made the login request as the search key, and extracts the terminal IDs of other request source terminals in which the terminal ID "01*aa*" of the request source terminal (the terminal 10*aa*) is registered as the destination terminal candidate (step S29). In the destination list management table illustrated in FIG. 14, "01*ba*", "01*ca*", and "01*da*" are extracted as the terminal IDs of other request source terminal. In the following, for the sake of simplification of description, the description will proceed with the example in which "01*ba*", "01*ca*", and "01*da*" are extracted as the terminal IDs of other request source terminals.

Next, the extracting unit 54 searches the terminal status management table (see FIG. 13) using the terminal ID "01*aa*" of the request source terminal (the terminal 10*aa*) that has made the login request as the search key, and acquires the operation status of the request source terminal (the terminal 10*aa*) that has made the login request (step S30). Then, the transceiving unit 51 transmits the destination status information including the terminal ID "01*aa*" of the request source terminal (the terminal 10*aa*) acquired in step S30 and the operation status "online" to the terminals (10*ba* and 10*ca*) whose operation status is set to "online" in the terminal status management table (see FIG. 13) among the terminals (10*ba*, 10*ca*, and 10*da*) related to the terminal IDs ("01*ba*", "01*ca*", and "01*da*") extracted in step S29 (step S31-1, S31-2). Further, when the transceiving unit 51 transmits the destination status information to the terminals (10*ba* and 10*ca*), the IP address of the terminal managed in the terminal status management table (see FIG. 13) is referred to on the basis of each of the terminal IDs ("01*ba*" and "01*ca*"). Thus, the terminal ID "01*aa*" of the request source terminal (the terminal 10*aa*) that has made the login request and the operation status "online" can be transmitted to each of the other destination terminals (the terminals 10*ba* and 10*ca*) that can perform communication with the request source terminal (the terminal 10*aa*) that has made the login request as the destination.

The operation status of the terminal 10*da* serving as the non-dedicated terminal D is not managed in the terminal status management table (see FIG. 13), and thus the terminal ID "01*aa*" of the request source terminal (the terminal 10*aa*) that has made the login request and the operation status "online" are hardly transmitted to the terminal 10*da*. In other words, the non-dedicated terminal D side hardly use a service of acquiring the operation status of the dedicated terminal A.

Meanwhile, even in another terminal 10, when the user turns on the power supply switch 109 illustrated in FIGS. 6 and 7 similarly to step S21, the operation input receiving unit 12 illustrated in FIG. 9 receives the power-on input, and the same process as the process of steps S22 to S31-1, S31-2 is performed, and thus a description thereof will not be made.

Figure 19:
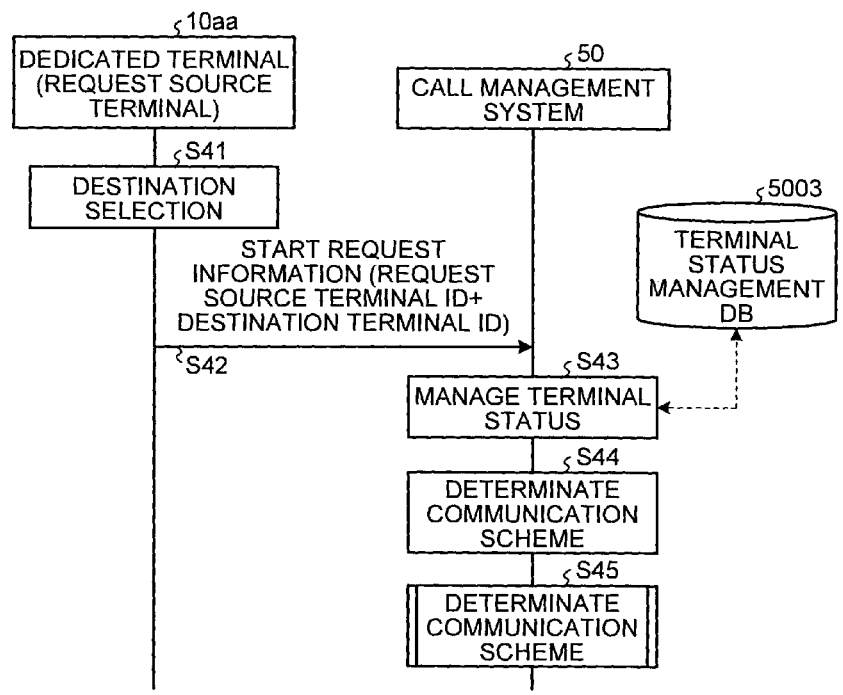
FIG. 19 is a sequence diagram illustrating a call start request.

Next, the description will proceed with an example in which a call is performed between the two dedicated terminals A with reference to FIGS. 6 and 9 and FIGS. 19 to 22. FIG. 19 is a sequence diagram illustrating a call start request.

Referring to FIG. 19, first, when the user of the request source terminal (the terminal 10*aa*) serving as the dedicated terminal A pushes down the operation button 108 illustrated in FIG. 6 and selects the destination terminal (the terminal 10*ca*) serving as the dedicated terminal A that is the destination candidate, the operation input receiving unit 12 illustrated in FIG. 9 receives a request to start a call with the destination terminal (the terminal 10*ca*) (step S41). Then, the transceiving unit 11 of the request source terminal (the terminal 10*aa*) transmits start request information representing a call start desire to the call management system 50 (step S42). The start request information includes the terminal ID "01*aa*" of the request source terminal (the terminal 10*aa*) and the terminal ID "01*ca*" of the destination terminal (the terminal 10*ca*).

Then, the status managing unit 53 of the call management system 50 illustrated in FIG. 9 changes all the operation status field portions of the records respectively including the terminal ID "01*aa*" and the terminal ID "01*ca*" in the terminal status management table (see FIG. 13) to "online (busy)" based on the terminal ID "01*aa*" of the request source terminal (the terminal 10*aa*) and the terminal ID "01*ca*" of the destination terminal (the terminal 10*ca*) included in the start request information (step S43). In this state, the request source terminal (the terminal 10*aa*) and the destination terminal (the terminal 10*ca*) do not start a call but becomes the busy state, and when another terminal 10 desires to make a call to the request source terminal (the terminal 10*aa*) or the destination terminal (the terminal 10*ca*), an alert tone or a display representing a so-called busy state is output.

Next, the session managing unit 56 of the call management system 50 generates a session ID used to establish a communication session (step S44). Then, the call management system 50 determines a communication scheme that can be used by the destination terminal (the terminal 10*ca*) (step S45).

Figure 20:
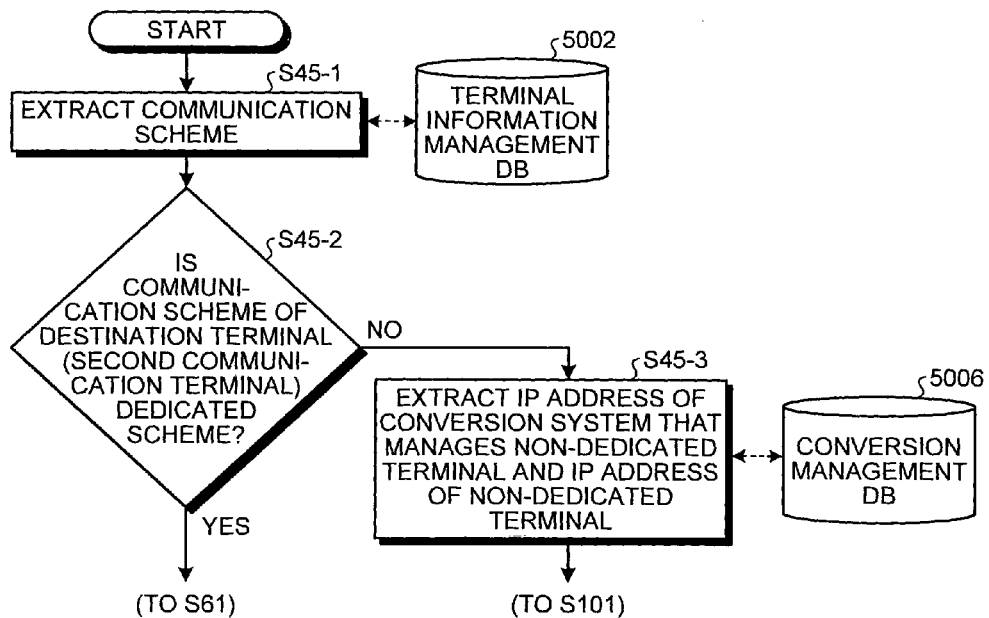
FIG. 20 is a flowchart illustrating a determination of a communication scheme.

Here, step S45 will be described in detail with reference to FIG. 20. FIG. 20 is a flowchart illustrating a determination of a communication scheme.

Referring to FIG. 20, the extracting unit 54 searches the terminal information management table (see FIG. 12) based on the terminal ID "01*ca*" of the destination terminal (the terminal 10*ca*) received by the transceiving unit 51, and extracts a corresponding communication scheme information (step S45-1).

Next, the determining unit 55 determines whether or not a communication scheme represented by the extracted communication scheme information is a communication scheme that can be used by the request source terminal (the terminal 10*aa*) serving as the dedicated terminal A (step S45-2). Specifically, the determining unit 55 determines whether or not a communication scheme represented by the communication scheme information extracted by the extracting unit 54 is the same as a communication scheme that can be used by the request source terminal (the terminal 10aa). The two communication schemes are determined to be the same as each other when the two communication schemes are the same in both of the call control scheme and the coding scheme, but the two communication schemes are determined to be not the same as each other when the two communication schemes are different in at least one of the call control scheme and the coding scheme.

Figure 21:
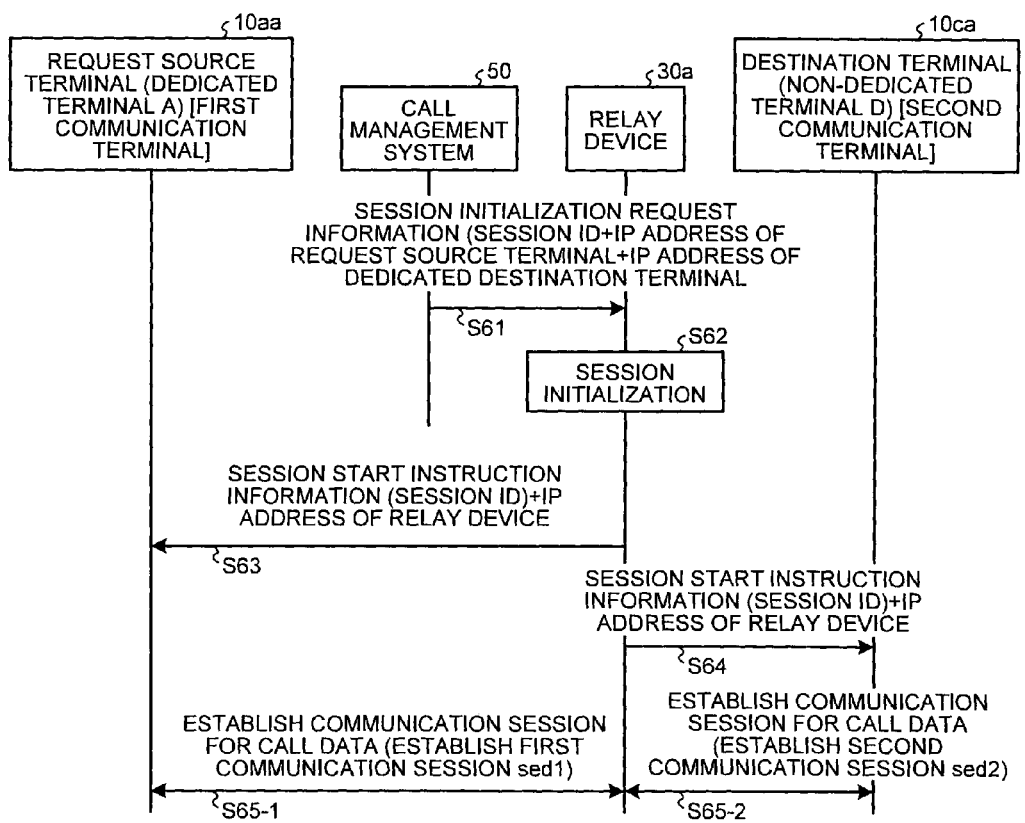
FIG. 21 is a sequence diagram illustrating a process of establishing a communication session before a call is performed between two dedicated terminals.

Then, when the determining unit 55 determines that the two communication schemes are the same as each other (YES in step S45-2), the process proceeds to step S61 illustrated in FIG. 21 which will be described later. Here, since the destination terminal (the terminal 10ca) is the same dedicated terminal A as the request source terminal (the terminal 10aa), the description will proceed starting from step S61. FIG. 21 is a sequence diagram illustrating a process of establishing a communication session before a call is performed between the two dedicated terminals A. In the present embodiment, the description will proceed with an example in which the relay device 30a connected to the same LAN 2a as in the request source terminal (the terminal 10aa) is used among a plurality of relay devices 30.

Referring to FIG. 21, the call management system 50 transmits session initialization request information to initialize a communication session established by the relay device 30a to the relay device 30a through the transceiving unit 51 (step S61). The session initialization request information includes the session ID generated in step S44 and the IP addresses of the request source terminal (the terminal 10aa) and the destination terminal (the terminal 10ca) managed by the terminal status management table (see FIG. 13). The call management system 50 also transmits the IP address of the call management system 50 when transmitting the session initialization request information to the relay device 30a. Thus, the transceiving unit 31 of the relay device 30a receives the session initialization request information and the IP address of the call management system 50.

Next, the transceiving unit 31 of the relay device 30a initializes the communication session (step S62). Then, the transceiving unit 31 transmits the session start instruction information to instruct a start of the communication session to the request source terminal (the terminal 10aa) (step S63). The session start instruction information includes the session ID transmitted from the call management system 50. Further, the relay device 30a also transmits the IP address of the relay device 30a to the request source terminal (the terminal 10aa) when transmitting the session start instruction information. Thus, the transceiving unit 11 of the request source terminal (the terminal 10aa) receives the session start instruction information and the IP address of the relay device 30a.

Similarly, the transceiving unit 31 transmits the session start instruction information to instruct a start of the communication session to the destination terminal (the terminal 10ca) (step S64). The session start instruction information includes the session ID transmitted from the call management system 50. Further, the relay device 30a also transmits the IP address of the relay device 30a to the destination terminal (the terminal 10ca) when transmitting the session start instruction information. Thus, the transceiving unit 11 of the destination terminal (the terminal 10ca) receives the session start instruction information and the IP address of the relay device 30a.

As a result, the communication session (the first communication session sed1 illustrated in FIG. 2) to transmit and receive call data is established between the request source terminal (the terminal 10aa) and the relay device 30a based on step S63 (step S65-1). Further, the communication session (the second communication session sed2 illustrated in FIG. 2) to transmit and receive call data is established between the relay device 30a and the destination terminal (the terminal 10ca) based on step S64 (step S65-2).

Figure 22:
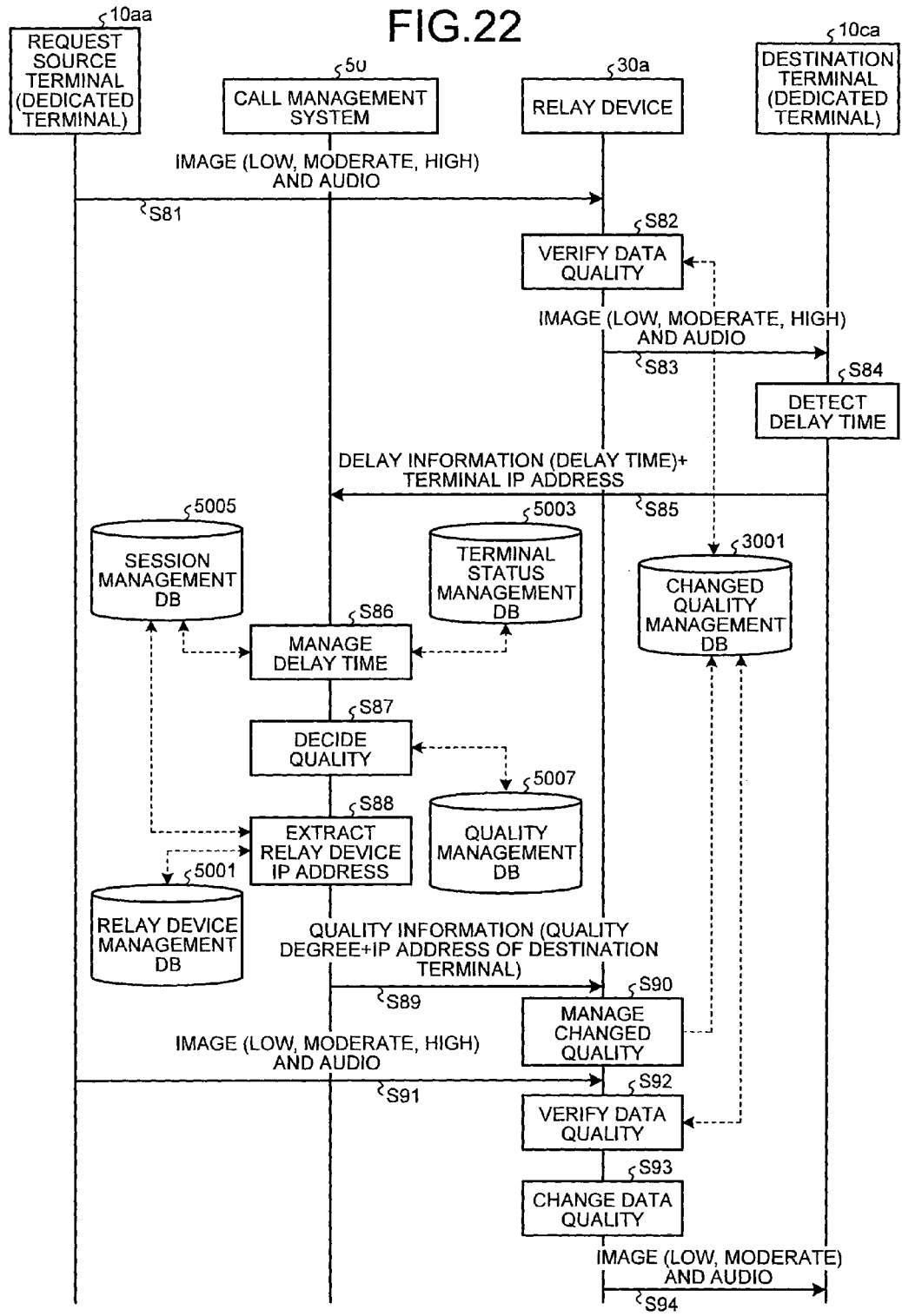
FIG. 22 is a sequence diagram illustrating a process of transmitting and receiving call data between two dedicated terminals.

Next, a process of transmitting and receiving call data in order to perform a call such as a video conference between the request source terminal and the destination terminal will be described with reference to FIG. 22. FIG. 22 is a sequence diagram illustrating a process of transmitting and receiving call data between the two dedicated terminals A. In a process of transmitting a call data from the terminal 10aa to the terminal 10ca in one direction and a process of transmitting call data from the terminal 10ca to the terminal 10aa in a reverse direction, transmission and reception of call data, detection of the delay time which will be described later, or the like is performed by the same process, and thus the description will proceed with communication in one direction, and a description of communication in the reverse direction will not be made.

First, the request source terminal (the terminal 10aa) transmits subject image data imaged by the imaging unit 14 and audio data of a sound input through the audio input unit 15a to the relay device 30a via the communication network 2 through the transceiving unit 11 using the communication session sed1 (step S81). In the present embodiment, high-quality image data having the three resolutions, that is, the low resolution, the moderate resolution, and the high resolution illustrated in FIG. 3 and audio data are transmitted. Thus, the relay device 30a receives the image data having the three resolutions and the audio data through the transceiving unit 31. Then, the data quality verifying unit 33 verifies a quality of an image of image data to be relayed by searching the changed quality management table (see FIG. 10) using the IP address "1.3.1.3" of the destination terminal (the terminal 10ca) as the search key and extracting an image quality of corresponding image data to be relayed (step S82). In the present embodiment, since the verified image quality of image data is the "high image quality" and is the same as the image quality of the image data received by the transceiving unit 31, the relay device 30a transfers the image data with the same image quality and the audio data with the same audio quality to the destination terminal (the terminal 10ca) using the communication session sed2 (step S83). Thus, the destination terminal (the terminal 10ca) receives the high-quality image data having the three resolutions, that is, the low resolution, the moderate resolution, the high resolution and the audio data through the transceiving unit 11. Then, the display control unit 16 can cause an image to be displayed on the display 120 based on a combination of the image data having the three image qualities, and the audio output unit 15b can output a sound based on the audio data.

Next, the delay detecting unit 17 of the destination terminal (the terminal 10ca) detects the reception delay time of the image data received through the transceiving unit 11 at predetermined time intervals (for example, each second (step S84). In the present embodiment, the following description will proceed with an example in which the delay time is 200 (ms).

The transceiving unit 11 of the destination terminal (the terminal 10ca) transmits the delay time information representing the delay time "200 (ms)" to the call management system 50 via the communication network 2 through the management communication session sei illustrated in FIG. 2 (step S85). Thus, the call management system 50 can detect the delay time and detect the IP address "1.3.1.3" of the terminal 10ca serving as the transmission source of the delay time information.

Next, the delay time managing unit 58 of the call management system 50 searches the terminal status management table (see FIG. 13) using the IP address "1.3.1.3" of the destination terminal (the terminal 10ca) as the search key and extracts the corresponding terminal ID "01ca", and manages the delay time "200 (ms)" represented by the delay time information to be stored in the delay time field portion in the record of the terminal ID "01ca" in the session management table (see FIG. 15) (step S86).

Next, the quality deciding unit 57 decides the image quality as the "moderate image quality" by searching the quality management table (see FIG. 17) using the delay time "200 (ms)" as the search key and extracting an image quality "moderate image quality" of corresponding image data (step S87).

Next, the transceiving unit 51 searches the relay device management table (see FIG. 11) using the relay device ID "111a" associated with the terminal ID "01ca" in the session management table (see FIG. 15) as the search key, and extracts the IP address "1.2.1.2" of the corresponding relay device 30a (step S88). Then, the transceiving unit 51 transmits the quality information representing the image quality "moderate image quality" of the image data decided in step S87 to the relay device 30a via the communication network 2 through the management communication session sei (step S89). The quality information includes the IP address "1.3.1.3" of the destination terminal (the terminal 10ca) used as the search key in step S86. Thus, in the relay device 30a, the changed quality managing unit 34 manages the IP address "1.3.1.3" of the transmission destination terminal 10 (here, the terminal 10ca) and the image quality "moderate image quality" of the image data to be relayed to be stored in the changed quality management table (see FIG. 10) in association with each other (step S90).

Next, similarly to step S81, the request source terminal (the terminal 10aa) transmits the high-quality image data having the three resolutions, that is, the low resolution, the moderate resolution, the high resolution and the audio data to the relay device 30a through the first communication session sed1 (step S91). Thus, in the relay device 30a, similarly to step S82, the data quality verifying unit 33 verifies a quality of an image of image data to be relayed by searching the changed quality management table (see FIG. 10) using the IP address "1.3.1.3" of the destination terminal (the terminal 10ca) as the search key and extracting an image quality "moderate image quality" of corresponding image data to be relayed (step S92). In the present embodiment, since the verified image quality of image data is the "moderate image quality" and is lower than the image quality "high image quality" of the image data received by the transceiving unit 31, the data quality changing unit 35 suppresses an image quality of image data from the "high image quality" to the "moderate image quality" and changes the quality of the image of the image data (step S93).

Then, the transceiving unit 31 transmits the image data in which an image quality of image data has been changed to the "moderate image quality" and the audio data in which a sound quality of a sound has not been changed to the destination terminal (the terminal 10ca) via the communication network 2 through the second communication session sed2 (step S94). Thus, the destination terminal (the terminal 10ca) receives image data of a moderate image quality having two resolutions, that is, the low resolution, the moderate resolution and the audio data through the transceiving unit 11. Then, the display control unit 16 can cause an image to be displayed on a display 120ca based on a combination of the image data having the two resolutions, and the audio output unit 15b can output a sound based on the audio data.

As described above, when a reception delay occurs in the destination terminal (the terminal 10ca) that receives image data, the relay device 30a changes a quality of an image, and thus that the user who attends a call such as a video conference does not feel uncomfortable. In other words, a service to cope with a reception delay of image data can be provided between the two dedicated terminals A.

Next, the second communication pattern in which a call is performed between the dedicated terminal A (an example of a first communication terminal) and the non-dedicated terminal D (and example of a second communication terminal) will be described with reference to FIG. 20 and FIGS. 23 to 25. Specifically, a call is performed between the terminal 10aa serving as the dedicated terminal A and the terminal 10da serving as the non-dedicated terminal D. Further, the present embodiment will be described in connection with an example in which as a communication scheme used by the terminal 10aa, a call control scheme is a protocol of an instant messenger (or a protocol extended from a protocol of an instant messenger), and a coding scheme is the SVC, whereas as a communication scheme used by the terminal 10da, a call control scheme is the SIP, and a coding scheme is the AVC.

Further, in FIGS. 18 and 19, the second communication pattern is different from the first communication pattern in that the destination terminal (the terminal 10da) selects the destination in step S41 rather than the destination terminal (the terminal 10ca), and thus the terminal ID of the destination terminal used for transmission and reception or a search is also changed, and thus a description thereof will not be made. Then, the description will proceed from when the determining unit 55 determines that the two communication schemes are not the same in step S45-2 illustrated in FIG. 20 (NO).

In the case of the second communication pattern, the extracting unit 54 searches the conversion management table (see FIG. 16) based on the terminal ID "01da" of the destination terminal (the terminal 10da) received through the transceiving unit 51, and extracts the corresponding IP address "1.3.2.2" of the conversion system 80 and the IP address "1.3.2.3" of the destination terminal (the terminal 10da) (step S45-3). Then, the process proceeds to step S101 illustrated in FIG. 23 which will be described later.

Figure 23:
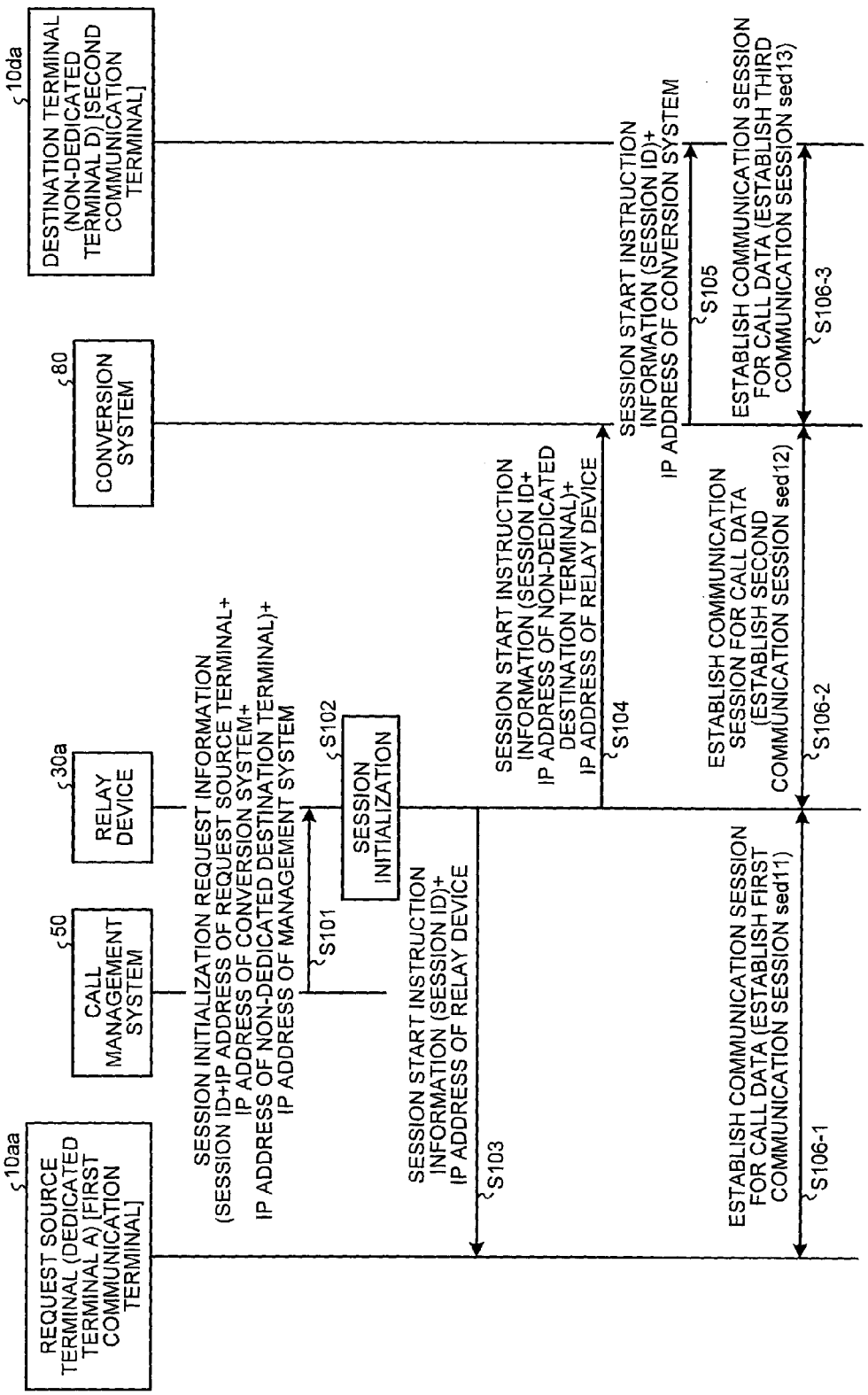
FIG. 23 is a sequence diagram illustrating a process of establishing a communication session before a call is performed between a dedicated terminal and a non-dedicated terminal.

FIG. 23 is a sequence diagram illustrating a process of establishing a communication session before a call is performed between the dedicated terminal A and the non-dedicated terminal D. Referring to FIG. 23, the call management system 50 transmits session initialization request information to initialize a communication session established by the relay device 30a to the relay device 30a through the transceiving unit 51 (step S101). The session initialization request information includes the session ID and the IP addresses of the request source terminal (the terminal 10aa), the conversion system 80, and the destination terminal (the terminal 10da). Of these, the session ID is the ID generated in step S44. The IP address of the request source terminal (the terminal 10aa) is managed in the terminal status management table (see FIG. 13). Further, the IP addresses of the conversion system 80 and the destination terminal (the terminal 10da) are the IP addresses extracted in step S45-3.

The call management system 50 also transmits the IP address of the call management system 50 when transmitting the session initialization request information to the relay device 30a. Thus, the transceiving unit 31 of the relay device 30a receives the session initialization request information and the IP address of the call management system 50.

Next, the transceiving unit 31 of the relay device 30a initializes the communication session (step S102). Then, the transceiving unit 31 transmits the session start instruction information to instruct a start of the communication session to the request source terminal (the terminal 10*aa*) (step S103). The session start instruction information includes the session ID transmitted from the call management system 50. Further, the relay device 30*a* also transmits the IP address of the relay device 30*a* to the request source terminal (the terminal 10*aa*) when transmitting the session start instruction information. Thus, the transceiving unit 11 of the request source terminal (the terminal 10*aa*) receives the session start instruction information and the IP address of the relay device 30*a*.

Similarly, the transceiving unit 31 transmits the session start instruction information to instruct a start of the communication session to the conversion system 80 (step S104). The session start instruction information includes the session ID transmitted from the call management system 50 and the IP address of the destination terminal (the terminal 10*da*). In other words, the transceiving unit 31 transmits the session start instruction information and transmits the IP address of the destination terminal (the terminal 10*da*). Further, the relay device 30*a* also transmits the IP address of the relay device 30*a* to the conversion system 80 when transmitting the session start instruction information. Thus, the transceiving unit 81 of the conversion system 80 receives the session start instruction information and the IP address of the relay device 30*a*.

Further, in the second communication pattern, the transceiving unit 81 of the conversion system 80 transmits the session start instruction information to instruct a start of the communication session to the destination terminal (the terminal 10*da*) (step S105). The session start instruction information includes the session ID transmitted from the call management system 50. Further, the conversion system 80 also transmits the IP address of the conversion system 80 to the destination terminal (the terminal 10*da*) when transmitting the session start instruction information. Thus, the transceiving unit 11 of the destination terminal (the terminal 10*da*) receives the session start instruction information and the IP address of the conversion system 80.

As a result, the communication session (the first communication session sed11 illustrated in FIG. 4) to transmit and receive call data is established between the request source terminal (the terminal 10*aa*) and the relay device 30*a* based on step S103 (step S106-1). Further, the communication session (the second communication session sed12 illustrated in FIG. 4) to transmit and receive call data is established between the relay device 30*a* and the conversion system 80 based on step S104 (step S106-2). Further, the communication session (the third communication session sed13 illustrated in FIG. 4) to transmit and receive call data is established between the conversion system 80 and the destination terminal (the terminal 10*da*) based on step S105 (step S106-3).

Figure 24:
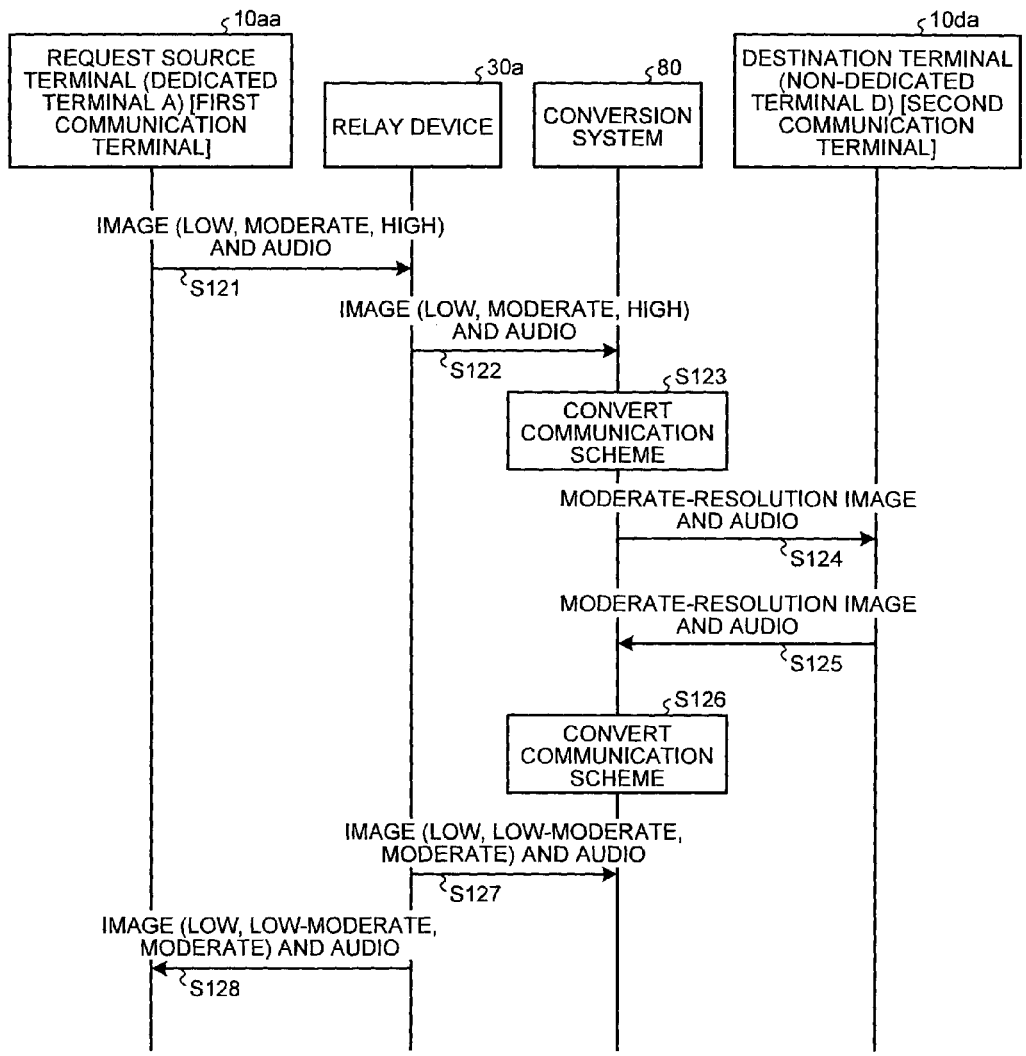
FIG. 24 is a sequence diagram illustrating a process of transmitting and receiving call data between a dedicated terminal and a non-dedicated terminal.

Next, a process of transmitting and receiving call data in order to perform a call such as a video conference between the request source terminal and the destination terminal will be described with reference to FIG. 24. FIG. 24 is a sequence diagram illustrating a process of transmitting and receiving call data between the dedicated terminal A and the non-dedicated terminal D.

First, the request source terminal (the terminal 10*aa*) transmits subject image data imaged by the imaging unit 14 and audio data of a sound input through the audio input unit 15*a* to the relay device 30*a* via the communication network 2 through the transceiving unit 11 using the communication session sed11 (step S121). In the second communication pattern, similarly to the first communication pattern, high-quality image data having the three resolutions, that is, the low resolution, the moderate resolution, and the high resolution illustrated in FIG. 3 and audio data are transmitted. Thus, the relay device 30*a* receives the image data having the three resolutions and the audio data through the transceiving unit 31.

Next, the relay device 30*a* transmits the high-quality image data having the three resolutions and the audio data to the conversion system 80 via the communication network 2 through the transceiving unit 31 using the communication session sed12 (step S122). Thus, the conversion system 80 receives the image data having the three resolutions and the audio data through the transceiving unit 81.

Next, the communication scheme converting unit 82 of the conversion system 80 converts the communication scheme of the image data having the three resolutions from the communication scheme used by the request source terminal (the terminal 10*aa*) to the communication scheme used by the destination terminal (the terminal 10*da*) based on the conversion rule data stored in the storage unit 8000 in advance (step S123). Here, as the conversion of the communication scheme is performed, the image data having the three resolutions (the high resolution, the moderate resolution, and the low resolution) illustrated FIG. 3 is converted into the image data having one resolution (the moderate resolution) illustrated in FIG. 5.

Next, the conversion system 80 transmits the audio data and the moderate-resolution image data to the terminal 10*da* via the communication network 2 through the transceiving unit 81 using the communication session sed13 (step S124). Thus, the destination terminal (the terminal 10*da*) receives the audio data and the moderate-resolution image data through the transceiving unit 11.

Meanwhile, when image data and audio data are transmitted from the destination terminal (the terminal 10*da*) to the request source terminal (the terminal 10*aa*), the destination terminal (the terminal 10*da*) transmits the audio data and the moderate-resolution image data to the conversion system 80 via the communication network 2 through the transceiving unit 11 using the communication session sed13 as illustrated in FIG. 24 (step S125). Thus, the conversion system 80 receives the audio data and the moderate-resolution image data through the transceiving unit 81.

Next, the communication scheme converting unit 82 of the conversion system 80 converts the communication scheme of the audio data and the moderate-resolution image data from the communication scheme used by the destination terminal (the terminal 10*da*) to the communication scheme used by the request source terminal (the terminal 10*aa*) based on the conversion rule data stored in the storage unit 8000 in advance (step S126).

Figure 25:
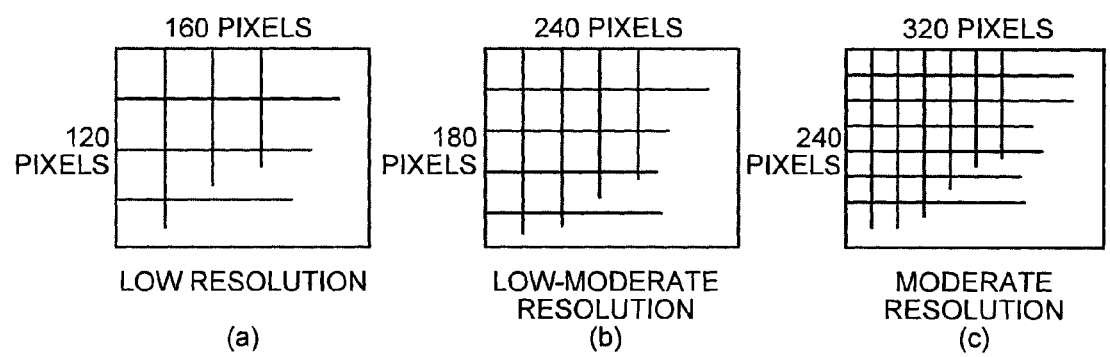
FIG. 25 is a conceptual diagram illustrating an image quality of image data converted by a conversion system.

FIG. 25 is a conceptual diagram illustrating an image quality of image data converted by the conversion system. As the communication scheme is converted in step S126, the image data having one resolution (the moderate resolution) illustrated in FIG. 5 is converted into low-resolution image data illustrated in (a) of FIG. 25, moderate-resolution image data illustrated in (c) of FIG. 25, and image data with a low moderate resolution which is a moderate resolution between the moderate resolution and the low resolution as illustrated in (b) of FIG. 25. In other words, even when moderate-resolution image data is transmitted from the destination terminal (the terminal 10*da*) serving as the non-dedicated terminal D, the conversion system 80 does not convert the moderate-resolution image data into the high-resolution image data transmitted in step S122, and the moderate-resolution image data transmitted from the destination terminal (the terminal 10*da*) has the maximum resolution and is converted into image data having the three resolutions, that is, the moderate resolution, the moderate resolution between the moderate resolution and the low resolution, and the low resolution.

Next, the conversion system 80 transmits the audio data and the image data having the three resolutions to the relay device 30*a* via the communication network 2 through the transceiving unit 81 using the communication session sed12 (step S127). Thus, the relay device 30*a* receives the audio data and the image data having the three resolutions through the transceiving unit 31. Then, the relay device 30*a* transmits the audio data and the image data having the three resolutions to the request source terminal (the terminal 10*aa*) via the communication network 2 through the transceiving unit 31 using the communication session sed11 (step S128). Thus, the request source terminal (the terminal 10*aa*) receives the audio data and the image data having the three resolutions through the transceiving unit 11.

Main Effects of Present Embodiment

As described above, according to the present embodiment, the session initialization request information to be transmitted from the call management system 50 to the relay device 30*a* includes the IP addresses of the request source terminal, the conversion system 80, and the destination terminal. Thus, the relay device 30*a* can transmit the session start instruction information to the IP address of the request source terminal and transmit the session start instruction information including the IP address of the destination terminal to the IP address of the conversion system 80. As a result, the conversion system 80 can transmit the session start instruction information to the IP address of the destination terminal.

As the session initialization request information is transmitted by the call management system 50 as described above, the first communication session sed11 can be established between the relay device 30 and the request source terminal, the second communication session sed12 can be established between the relay device 30 and the conversion system 80, and the third communication session sed13 can be established between the conversion system 80 and the destination terminal. Thus, even when the request source terminal and the destination terminal use different call schemes from each other, the communication schemes of call data are mutually converted by the conversion system 80, and there is an effect by which a call can be implemented.

Supplement of Embodiment

The above description has been made in connection with the example in which the request source terminal or the dedicated terminal A is used as an example of the first communication terminal, and the destination terminal or the non-dedicated terminal D is used as an example of the second communication terminal. However, the present invention is not limited to this example, and the destination terminal or the non-dedicated terminal D may be used as an example of the first communication terminal, and the request source terminal or the dedicated terminal A may be used as an example of the second communication terminal.

The call data is an example of communication data. The communication data includes a text or image file data. The terminal 10 is an example of the communication terminal. For example, an information processing terminal that transmits and receives the file data as well as a terminal that performs a call may be used as the communication terminal. Further, the call management system 50 is an example of the communication management system. For example, a file management system that manages processing of the file data as well as a system that manages a call may be used as the communication management system. In addition, the call system 1 is an example of the communication system. The communication system is constructed by the communication terminal and the communication management system.

In the above embodiment, the call management system 50 manages communication scheme information through the terminal information management table (see FIG. 12). However, the present invention is not limited to this example, and the request source terminal may manage communication scheme information of the destination terminal.

As a result, in step S42 illustrated in FIG. 19, the request source terminal (the terminal 10*aa*) can transmit the start request information including the terminal ID of the request source terminal and the terminal ID of the destination terminal and the communication scheme information to the call management system 50. In this case, in step S41 of FIG. 19, the display control unit 16 may cause a selection screen used to select the non-dedicated terminal as the destination of a call to be displayed on the display 120 and encourages the user to make a selection.

Then, when the destination is selected on the selection screen, in step S42 of FIG. 19, the request source terminal (the terminal 10*aa*) transmits the start request information including information (communication scheme information) representing that the destination terminal ID is the non-dedicated terminal to the call management system. In this case, the call management system 50 needs not execute step S45-1 of FIG. 20, determines that the communication scheme of the destination terminal is not "dedicated" based on the communication scheme information included in the start request information (NO in step S45-2 of FIG. 20), and causes the process to proceed to step S45-3 of FIG. 20.

In addition, the user needs not necessarily make a selection on the selection screen. For example, when the user already knows the destination information of the destination terminal, the operation input receiving unit 12 may receive an input of the destination information (the IP address or the like) of the destination terminal from the user. In this case, in step S42, the request source terminal transmits the start request information including the destination information of the destination terminal and the information (the communication scheme information) representing that the destination terminal is "non-dedicated" rather than the terminal ID of the destination terminal to the call management system 50. Then, at the call management system 50 side, in step S45-2, the determining unit 55 determines that the destination terminal represented by the destination information is not "dedicated", and then causes the process to proceed to step S45-3. Further, in step S45-3, the extracting unit 54 extracts the destination information of the conversion system 80 based on the destination information of the non-dedicated terminal, and causes the process to proceed to step S101.

Further, the terminal ID may be stored in the terminal 10 in advance at the time of factory shipment or may be input by the user.

In the above-described embodiment, the relay device 30, the call management system 50, the conversion system 80, the program providing system 90, and the maintenance system 100 may be constructed by a single computer or may be constructed by a plurality of computers in which respective portions (functions or devices) are divided and arbitrarily allocated. When the program providing system 90 is constructed by a single computer, a program transmitted by the program providing system 90 may be divided into a plurality of modules and then transmitted or may be transmitted without any division. Further, when the program providing system 90 is constructed by a plurality of computers, transmission from each computer may be performed in a state in which the program is divided into a plurality of modules.

In the present embodiment, as an example in which call control schemes of terminals are different from each other, a protocol of an instant messenger (or a protocol extended from a protocol of an instant messenger) and the SIP have been described, but the present invention is not limited to this combination as long as call control schemes of terminals are different from each other. For example, a combination of a protocol of an instant messenger (or a protocol extended from a protocol of an instant messenger) and H.323 may be used. Further, a combination of a protocol of an instant messenger and a protocol extended from a protocol of an instant messenger may be used.

Further, all a recording medium such as a CD-ROM storing each program of the above-described embodiment, the HD 204 storing the program, and the program providing system 90 including the HD 204 may be provided inside or outside the country as a program product.

Further, in the above-described embodiment, a quality of an image is managed by the changed quality management table illustrated in FIG. 10 and the quality management table illustrated in FIG. 17, focusing on the resolution of an image of image data as an example of a quality of an image of image data to be relayed by the relay device 30, and the present invention is not limited to this example. As another example of a quality, a quality may be managed focusing on the depth of an image quality of image data, a sampling frequency in a sound of audio data, or a bit length in a sound of audio data. Further, the audio data may be divided into three kinds of resolutions (the high resolution, the moderate resolution, and the low resolution) and then transmitted and received.

In FIGS. 11, 13, and 15, the reception date and time is managed, but the present invention is not limited to this example, and it is preferable that at least a reception time of the reception date and time be managed.

Further, in the above-described embodiment, the IP address of the relay device 30 is managed in FIG. 11, and the IP address of the terminal 10 is managed in FIG. 13, but the present invention is not limited to this example. When destination information specifies the relay device 30 on the communication network 2 or destination information specifies the terminal 10 on the communication network 2, each fully qualified domain name (FQDN) may be managed. In this case, an IP address corresponding to the FQDN is acquired by a known domain name system (DNS) server.

Further, in the above-described embodiment, the video conference system has been described as an example of the call system 1, but the present invention is not limited to this example, and the call system 1 may be a telephone system such as an internet protocol (IP) telephone or an Internet telephone. Further, the call system 1 may be a car navigation system. In this case, for example, one terminal 10 corresponds to a car navigation device mounted in a vehicle, and the other terminal 10 corresponds to a management terminal or a management server of a management center that manages a car navigation device, or a car navigation device mounted in another device. Further, the call system 1 may be a communication system of a mobile telephone. In this case, for example, the terminal 10 corresponds to a mobile phone.

In addition, in the above-described embodiment, image data and audio data have been described as an example of the call data, but the call data is not limited to this example, call data may be haptic (touch) data. In this case, sensory information generated by the user's touch at one terminal side is transmitted to the other terminal side. Further, the call data may be smell data. In this case, smelling (bad smelling) at one terminal is transmitted to the other terminal side. Furthermore, the call data is preferably at least one of image data, audio data, haptic data, and smell data.

In addition, the above-described embodiment has been described in connection with the example in which a video conference is performed by the call system 1, but the present invention is not limited to this example, and the call system 1 may be used for a meeting, an ordinary conversation between family members or friends, or provision of information in one direction.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A communication management system for managing communication between first and second communication terminals that transmit or receive communication data via at least a relay device, the communication management system comprising:
   a memory configured to store destination information representing a destination of the first communication terminal that establishes a first communication session with the relay device, destination information representing a destination of a conversion system that performs mutual conversion between a first communication method used by the first communication terminal to transmit or receive the communication data and a second communication method used by the second communication terminal to transmit or receive the communication data and establishes a second communication session with the relay device, and destination information representing a destination of the second communication terminal that establishes a third communication session with the conversion system; and
   circuitry configured to
      receive start request information to start communication between the first communication terminal and the second communication terminal from the first communication terminal;
      extract destination information of each of the first and the second communication terminals and the conversion system stored in the memory, on the basis of the received start request information; and
      transmit the extracted destination information to the relay device.

2. The communication management system according to claim 1, wherein
   the destination information of the second communication terminal indicates address information of the second communication terminal,
   the memory stores identification information for identifying the second communication terminal that is different from the destination information of the second communication terminal, the identification information being associated with the destination information of the conversion system and the address information of the second communication terminal, and
   the circuitry
      receives the identification information of the second communication terminal when receiving the start request information from the first communication terminal, and extracts the destination information of the conversion system and the address information of the second communication terminal which are associated with the received identification information of the second communication terminal in the memory.

3. The communication management system according to claim 2,
wherein the circuitry is configured to determine whether a communication scheme used by each of the communication terminals is a predetermined communication scheme,
wherein the memory is configured to manage communication scheme information representing the communication scheme used by each communication terminal in association with identification information of the communication terminal,
the circuitry
searches the memory on the basis of the received identification information of the second communication terminal, and extracts the corresponding communication scheme information,
determines whether the communication scheme represented by the extracted communication scheme information is the communication scheme used by the first communication terminal, and
when the circuitry determines that the communication scheme represented by the extracted communication scheme information is not the communication scheme used by the first communication terminal, searches the memory on the basis of the received identification information of the second communication terminal, and extracts the corresponding destination information of the conversion system and the destination information of the second communication terminal.

4. The communication management system according to claim 3, wherein
the communication method is represented by a call control method for establishing or disconnecting a connection with another communication terminal and a coding method for converting the communication data into IP packets, and
when the communication scheme represented by the communication method information extracted by the circuitry is different from the communication method used by the first communication terminal in at least one of the call control method and the coding method, the circuitry determines that the communication scheme represented by the extracted communication method information is not the communication method used by the first communication terminal.

5. The communication management system according to claim 1,
wherein the memory is configured to manage the destination information representing the destination of the first communication terminal in association with identification information for identifying the first communication terminal,
the circuitry receives the identification information of the first communication terminal from the first communication terminal when receiving the start request information, and
the circuitry searches the memory on the basis of the received identification information of the first communication terminal, and extracts the corresponding destination information of the first communication terminal.

6. A communication system, comprising:
the communication management system according to claim 1; and
the relay device,
wherein the relay device transmits an instruction to start the second communication session and the destination information of the second communication terminal to the destination represented by the destination information of the conversion system transmitted by the communication management system.

7. The communication system according to claim 6, further comprising the conversion system,
wherein the conversion system transmits an instruction to start the third communication session to the destination represented by the destination information of the second communication terminal transmitted by the relay device.

8. A communication management method for managing communication between first and second communication terminals that transmit or receive communication data via at least a relay device in a communication management system that includes a memory configured to store destination information representing a destination of the first communication terminal that establishes a first communication session with the relay device, destination information representing a destination of a conversion system that performs mutual conversion between a first communication method used by the first communication terminal to transmit or receive the communication data and a second communication method used by the second communication terminal to transmit or receive the communication data and establishes a second communication session with the relay device, and destination information representing a destination of the second communication terminal that establishes a third communication session with the conversion system, the method comprising:
receiving, by circuitry of the communication management system, start request information to start communication between the first communication terminal and the second communication terminal from the first communication terminal;
extracting, by the circuitry, destination information of each of the first and the second communication terminals and the conversion system stored in the memory, on the basis of the received start request information; and
transmitting, by the circuitry, the extracted destination information to the relay device.

9. The communication management method according to claim 8,
wherein the destination information of the second communication terminal indicates address information of the second communication terminal,
the memory stores identification information for identifying the second communication terminal that is different from the destination information of the second communication terminal, the identification information being associated with the destination information of the conversion system and the address information of the second communication terminal, and
the method includes
receiving, by the circuitry, the identification information of the second communication terminal when receiving the start request information from the first communication terminal, and
extracting, by the circuitry, the destination information of the conversion system and the address information of the second communication terminal which are associated with the received identification information of the second communication terminal in the memory.

10. The communication management method according to claim 9, further comprising determining whether a communication scheme used by each of the communication terminals is a predetermined communication scheme,
wherein the memory is configured to manage communication scheme information representing the communication scheme used by each communication terminal in association with identification information of the communication terminal,
the method further includes
searching, by the circuitry, the memory on the basis of the received identification information of the second communication terminal, and extracts the corresponding communication scheme information,
determining, by the circuitry, whether the communication scheme represented by the extracted communication scheme information is the communication scheme used by the first communication terminal, and
when the circuitry determines that the communication scheme represented by the extracted communication scheme information is not the communication scheme used by the first communication terminal, searching the memory on the basis of the received identification information of the second communication terminal, and extracting the corresponding destination information of the conversion system and the destination information of the second communication terminal.

11. The communication management method according to claim 10,
wherein the communication method is represented by a call control method for establishing or disconnecting a connection with another communication terminal and a coding method for converting the communication data into IP packets, and
when the communication scheme represented by the communication method information extracted by the circuitry is different from the communication method used by the first communication terminal in at least one of the call control method and the coding method, the method includes determining, by the circuitry, that the communication scheme represented by the extracted communication method information is not the communication method used by the first communication terminal.

12. The communication management method according to claim 8,
wherein the memory is configured to manage the destination information representing the destination of the first communication terminal in association with identification information for identifying the first communication terminal,
the receiving includes receiving the identification information of the first communication terminal from the first communication terminal when receiving the start request information, and
the extracting includes searching the memory on the basis of the received identification information of the first communication terminal, and extracting the corresponding destination information of the first communication terminal.

13. A non-transitory computer-readable recording medium with an executable program stored thereon, wherein the program instructs a communication management system to perform a communication management method for managing communication between first and second communication terminals that transmit or receive communication data via at least a relay device in a communication management system that includes a memory configured to store destination information representing a destination of the first communication terminal that establishes a first communication session with the relay device, destination information representing a destination of a conversion system that performs mutual conversion between a first communication method used by the first communication terminal to transmit or receive the communication data and a second communication method used by the second communication terminal to transmit or receive the communication data and establishes a second communication session with the relay device, and destination information representing a destination of the second communication terminal that establishes a third communication session with the conversion system, the method comprising:
receiving, by circuitry of the communication management system, start request information to start communication between the first communication terminal and the second communication terminal from the first communication terminal;
extracting, by the circuitry, destination information of each of the first and the second communication terminals and the conversion system stored in the memory, on the basis of the received start request information; and
transmitting, by the circuitry, the extracted destination information to the relay device.

14. A maintenance system that performs maintenance of the communication management system according to claim 1.

15. The communication management system according to claim 1, wherein each of the communication management system and the conversion system is constructed by one or more computers.

16. The communication management system according to claim 1, wherein the first communication method and the second communication method include at least a session control protocol and a video coding method, and
the first communication method and the second communication method differ in at least one of the session control protocol and the video coding method.

17. The communication management system according to claim 16, wherein
the video coding method for the first communication method is H.264/Scalable Video Coding (SVC), and
the video coding method for the second communication method is H.264/Advanced Video Coding (AVC).

18. The communication management method according to claim 8, wherein each of the communication management system and the conversion system is constructed by one or more computers.

19. The communication management method according to claim 8, wherein the first communication method and the second communication method include at least a session control protocol and a video coding method, and
the first communication method and the second communication method differ in at least one of the session control protocol and the video coding method.

20. The communication management method according to claim 19, wherein
the video coding method for the first communication method is H.264/Scalable Video Coding (SVC), and
the video coding method for the second communication method is H.264/Advanced Video Coding (AVC).

* * * * *